US012055253B2

(12) United States Patent
Worrall et al.

(10) Patent No.: US 12,055,253 B2
(45) Date of Patent: Aug. 6, 2024

(54) APPARATUS AND METHOD FOR BONDING TIE LAYERS ON REINFORCED THERMOSETTING RESIN LAMINATES FOR USE IN WELDING THERMOSET COMPOSITE PIPE JOINTS

(71) Applicant: SAUDI ARABIAN OIL COMPANY, Dhahran (SA)

(72) Inventors: Chris Worrall, Cambridge (GB); Farshad Salamat-Zadeh, Cambridge (GB); Abderrazak Traidia, Lussan (FR); Abdullah Al Shahrani, Dammam (SA); Waleed Al Nasser, Ad Dammam (SA); Konstantinos Vatopoulos, Amsterdam (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 246 days.

(21) Appl. No.: 17/644,194

(22) Filed: Dec. 14, 2021

(65) Prior Publication Data

US 2022/0196196 A1  Jun. 23, 2022

Related U.S. Application Data

(60) Provisional application No. 63/126,712, filed on Dec. 17, 2020.

(51) Int. Cl.
*F16L 47/02* (2006.01)
(52) U.S. Cl.
CPC .................................. *F16L 47/02* (2013.01)
(58) Field of Classification Search
CPC ............ F16L 47/02; F16L 47/06; F16L 47/16
See application file for complete search history.

(56) References Cited

U.S. PATENT DOCUMENTS 170,473 A   11/1875 Flagler et al.
2,142,150 A * 1/1939 Replogle ................. F16L 47/02
                                             285/286.1

(Continued)

FOREIGN PATENT DOCUMENTS

CA   2116083 A1   8/1994
CN   1086763 A    5/1994

(Continued)

OTHER PUBLICATIONS

Ageorges, C., et al. "Advances in fusion bonding techniques for joining thermoplastic matrix composites: a review", Composites Part A: Applied Science and Manufacturing. Elsevier, vol. 32, No. 6. Jun. 1, 2001, pp. 839-857, [19 Pages].

(Continued)

*Primary Examiner* — David Bochna
(74) *Attorney, Agent, or Firm* — Osha Bergman Watanabe & Burton LLP

(57) ABSTRACT

A system and method for coupling pipes includes a first pipe having a tapered, spigot end; and a second pipe having a tapered, socket end adapted to internally receive the tapered, spigot end of the first pipe. The first pipe and the second pipe are made from a reinforced thermosetting resin (RTR) material. A thermal joining process is used to bond a thermoplastic material onto the RTR material of the first pipe, the second pipe, or both pipes. Upon application of thermal heating to the first and second pipes, the heat between the first pipe and the second pipe is sufficient to melt the thermoplastic material such that, when the heat is removed, the hardened thermoplastic material seals the first pipe to the second pipe. A system and a method of coupling the first pipe and the second pipe may include the coupler made of RTR material.

13 Claims, 22 Drawing Sheets

(56) References Cited

U.S. PATENT DOCUMENTS

| | | | | |
|---|---|---|---|---|
| 2,498,831 A | * | 2/1950 | Veitch | F16L 47/02 285/294.1 |
| 2,559,806 A | | 7/1951 | Thompson | |
| 2,933,428 A | * | 4/1960 | Mueller | F16L 47/02 228/114.5 |
| 2,958,906 A | | 11/1960 | Youthed | |
| 3,002,871 A | | 10/1961 | Tramm et al. | |
| 3,061,503 A | | 10/1962 | Gould et al. | |
| 3,307,997 A | | 3/1967 | Detrick | |
| 3,506,519 A | | 4/1970 | Blumenkranz | |
| 3,946,761 A | | 3/1976 | Thompson et al. | |
| 4,090,899 A | | 5/1978 | Reich | |
| 4,165,104 A | * | 8/1979 | van den Beld | F16L 47/02 285/294.1 |
| 4,530,521 A | | 7/1985 | Nyffeler et al. | |
| 4,662,655 A | | 5/1987 | Fliervoet et al. | |
| 4,690,434 A | * | 9/1987 | Schmidt | F16L 47/02 285/31 |
| 4,865,674 A | | 9/1989 | Durkin | |
| 5,106,130 A | | 4/1992 | Ellsworth et al. | |
| 5,152,855 A | | 10/1992 | Jansman et al. | |
| 5,186,500 A | | 2/1993 | Folkers | |
| 5,213,379 A | | 5/1993 | Taniguchi et al. | |
| 5,264,059 A | | 11/1993 | Jacaruso et al. | |
| 5,520,422 A | * | 5/1996 | Friedrich | F16L 47/16 285/915 |
| 5,758,731 A | | 6/1998 | Zollinger | |
| 5,785,092 A | | 7/1998 | Friedrich et al. | |
| 5,951,812 A | * | 9/1999 | Gilchrist, Jr. | F16L 47/02 156/304.3 |
| 6,131,954 A | | 10/2000 | Campbell | |
| 6,521,072 B1 | | 2/2003 | Campbell | |
| 6,832,785 B1 | * | 12/2004 | Zitkovic, Jr. | F16L 47/02 285/285.1 |
| 7,240,697 B2 | | 7/2007 | Beebe et al. | |
| 8,418,728 B1 | * | 4/2013 | Kiest, Jr. | F16L 47/02 138/97 |
| 8,424,924 B2 | | 4/2013 | LaMarca et al. | |
| 8,522,827 B2 | | 9/2013 | Lazzara et al. | |
| 8,746,747 B2 | | 6/2014 | McPherson | |
| 9,285,063 B2 | | 3/2016 | Jones | |
| 9,358,764 B2 | | 6/2016 | Prebil et al. | |
| 9,523,447 B2 | | 12/2016 | Conrad | |
| 9,528,638 B2 | | 12/2016 | Hooberman | |
| 9,534,719 B2 | | 1/2017 | Eccleston et al. | |
| 9,810,359 B2 | | 11/2017 | Spears et al. | |
| 2004/0222627 A1 | | 11/2004 | Krah | |
| 2006/0049631 A1 | * | 3/2006 | Tolhoek | F16L 47/16 285/374 |
| 2006/0255590 A1 | * | 11/2006 | Ludeman | F16L 47/02 285/288.1 |
| 2006/0279084 A1 | | 12/2006 | Collins | |
| 2008/0187697 A1 | * | 8/2008 | Amano | F16L 47/02 156/272.8 |
| 2009/0277579 A1 | * | 11/2009 | Marelli | F16L 47/02 156/293 |
| 2013/0036604 A1 | | 2/2013 | Schmidt et al. | |
| 2013/0140811 A1 | * | 6/2013 | Fahrer | F16L 13/103 285/285.1 |
| 2013/0175797 A1 | | 7/2013 | Kanao | |
| 2014/0013797 A1 | | 1/2014 | Butts | |
| 2014/0137971 A1 | | 5/2014 | Lundman | |
| 2014/0220356 A1 | | 8/2014 | Van Tooren | |
| 2014/0363220 A1 | | 12/2014 | Auer et al. | |
| 2014/0375047 A1 | | 12/2014 | Jones | |
| 2015/0219254 A1 | * | 8/2015 | Lee | F16L 47/02 285/294.1 |
| 2019/0128458 A1 | | 5/2019 | Kimball et al. | |
| 2022/0018479 A1 | | 1/2022 | Traidia et al. | |

FOREIGN PATENT DOCUMENTS

| | | |
|---|---|---|
| CN | 1263977 C | 7/2006 |
| CN | 104708890 B | 12/2018 |
| CN | 110131511 A | 8/2019 |
| CN | 110823481 A | 2/2020 |
| DE | 939719 C | 3/1956 |
| DE | 19911284 A1 | 9/2000 |
| EP | 0382593 A2 | 8/1990 |
| EP | 2340389 A2 | 7/2011 |
| EP | 2694273 A2 | 2/2014 |
| EP | 3717736 B1 | 3/2022 |
| GB | 775223 A | 5/1957 |
| GB | 775233 A | 5/1957 |
| GB | 1 329 364 A | 9/1973 |
| GB | 2033394 A | 5/1980 |
| GB | 2 271 958 A | 5/1994 |
| GB | 2425337 A | 10/2006 |
| JP | H10-281383 A | 10/1998 |
| JP | 2002-295780 A | 10/2002 |
| JP | 2003-130276 A | 5/2003 |
| JP | 2009018576 A | 1/2009 |
| WO | 96/26380 A1 | 8/1996 |
| WO | 00/55538 A1 | 9/2000 |
| WO | 2005025836 A1 | 3/2005 |
| WO | 2008028224 A1 | 3/2008 |
| WO | 2009/007537 A1 | 1/2009 |
| WO | 2010033163 A2 | 3/2010 |
| WO | 2012137197 A2 | 10/2012 |
| WO | 2020/007924 A1 | 1/2020 |
| WO | 2022020301 A1 | 1/2022 |
| WO | 2022133272 A1 | 6/2022 |

OTHER PUBLICATIONS

Hou, Meng. "Thermoplastic Adhesive for Thermosetting Composites", Materials Science Forum vols. 706-709. Jan. 3, 2012, pp. 2968-2973, [7 Pages].

Nomura, H., et al. "Linear Vibration Welding of Polyethylene Pipes", In Proceedings of the 10th Plastic Pipes, Plastic Pipes Conference Association, Gothenburg, Sweden. Sep. 1998, pp. 669-678, [10 Pages].

Troughton, et al. "Linear Vibration Welding of Polyethylene Pipes", In Proceedings of the 10th Plastic Pipes, Plastic Pipes Conference Association, Gothenburg, Sweden. Sep. 1998, pp. 424-432, [9 Pages].

International Search Report and Written Opinion issued in corresponding PCT International Application No. PCT/US2021/064133 dated Apr. 19, 2022 (32 pages).

Office Action issued in the correspondence U.S. Appl. No. 17/380,748, mailed Nov. 10, 2022 (12 pages).

Office Action issued in the correspondence U.S. Appl. No. 17/380,562, mailed Mar. 15, 2022 (11 pages).

Office Action issued in the corresponding U.S. Appl. No. 17/380,885, mailed Aug. 18, 2022 (6 pages).

Hamade, Ramsey F. et al. "Rotary Friction Welding versus Fusion Butt Welding of Plastic Pipes—Feasibility and Energy Perspective" Procedia Manufacturing 33 (2019) 693-700 (8 pages).

Moorleghem, R. Van "Welding of thermoplastic to thermoset composites through a thermoplastic interlayer", MSc Thesis, TU Delft, 2016 (67 pages).

Villegas, I.F. et al. "Ultrasonic welding of carbon/epoxy and carbon/PEEK composites through a PEI thermoplastic coupling layer". Composites Part A, 2018 (28 pages).

Beiss, T. et al. "Vibration joining of fiber-reinforced thermosets" (2010) Polymer Composites, 31 (7), pp. 1205-1212 (8 pages).

Yousefpour, Ali et al., "Fusion Bonding/Welding of Thermoplastic Composites"; Journal of Thermoplastic Compostie Materials; vol. 17; Issue 4; pp. 303-341; Jul. 2004 (39 pages).

Dell'Anna, Riccardo et al., "Lay-Up and Consolidation of a Composite Pipe by In Situ Ultrasonic Welding of a Thermoplastic Matrix Composite Tape"; MDPI Open Access Journals: Minerals; vol. 11, Issue 5: 786; pp. 1-11; May 11, 2018 (11 pages).

(56) References Cited

OTHER PUBLICATIONS

International Search Report and Written Opinion of the International Searching Authority issued in corresponding International Application No. PCT/US2021/042296, mailed on Oct. 14, 2021 (14 pages).
International Search Report and Written Opinion of the International Searching Authority issued in corresponding International Application No. PCT/US2021/042330, mailed on Oct. 15, 2021 (24 pages).
International Search Report and Written Opinion of the International Searching Authority issued in corresponding International Application No. PCT/US2021/042308, mailed on Oct. 15, 2021 (14 pages).
Final Office Action issued in corresponding U.S. Appl. No. 17/380,748, mailed on Nov. 10, 2022 (12 pages).
O. Schieler et al., "Induction Welding of Hybrid Thermoplastic-thermoset Composite Parts", KMUTNB Int J Appl Sci Technol., 2016, vol. 9, No. 1, pp. 27-36 (10 pages).
Office Action issued in the correspondence U.S. Appl. No. 17/380,748, mailed May 10, 2022 (14 pages).
Office Action issued in the correspondence U.S. Appl. No. 17/380,748, mailed Mar. 16, 2023 (11 pages).
Office Action issued in the corresponding Saudi Arabian Application No. 122440921, mailed Nov. 2, 2023 (6 pages).
International Search Report and Written Opinion issued in Application No. PCT/US2023/082081, mailed on Mar. 13, 2024 (12 pages).

\* cited by examiner

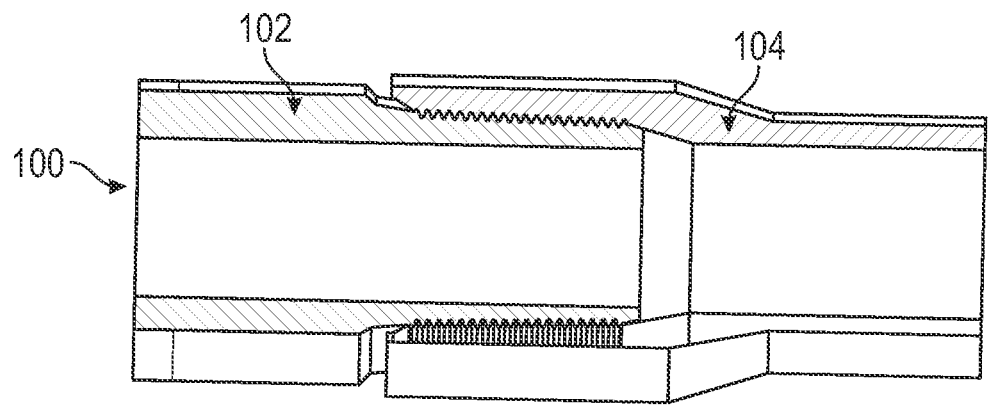
PRIOR ART FIG. 1A
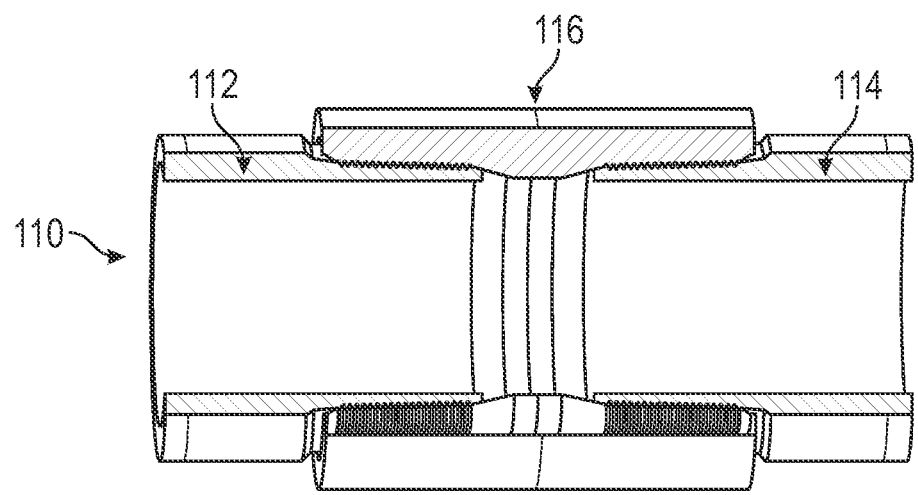
PRIOR ART FIG. 1B

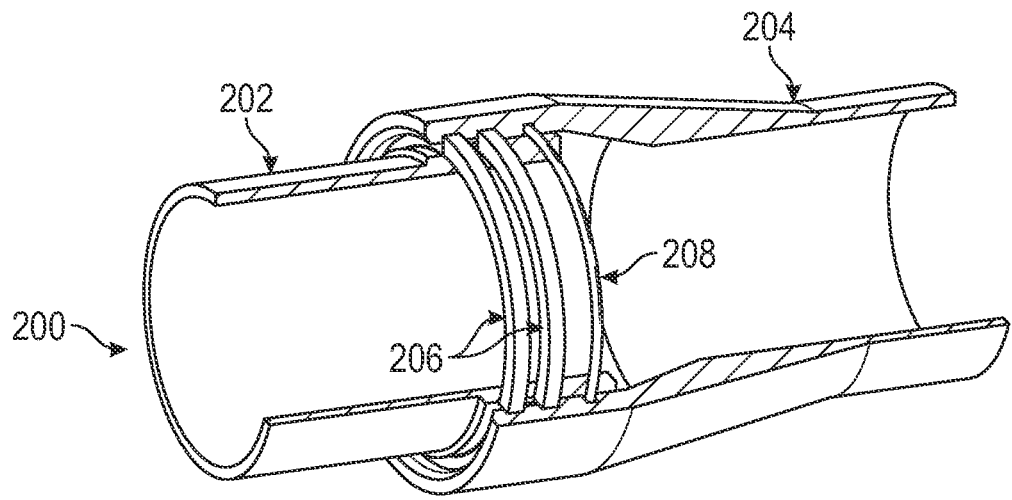
PRIOR ART FIG. 2
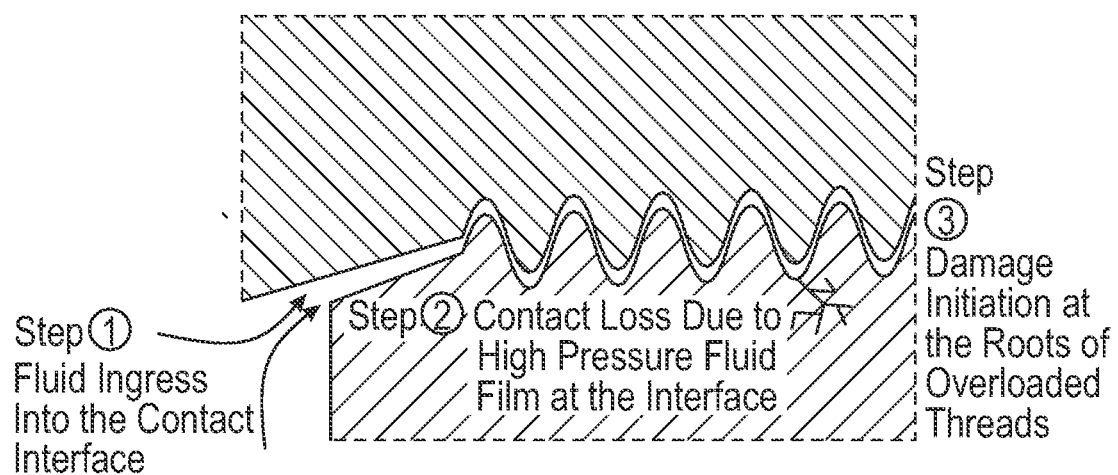
PRIOR ART FIG. 3

Thermally Sprayed PEEK (Second Technique, PT2). (b)Thermally Sprayed PEEK (First Technique, PT1).

Optical Micrographs of Thermally Sprayed PEEK/Aluminium Surface: (a) PT2-1, (b) PT1-1, (c) PT2-2 and (d) PT1-2.

Details of the Thompson E20 Linear Friction Welding Machine — 1500
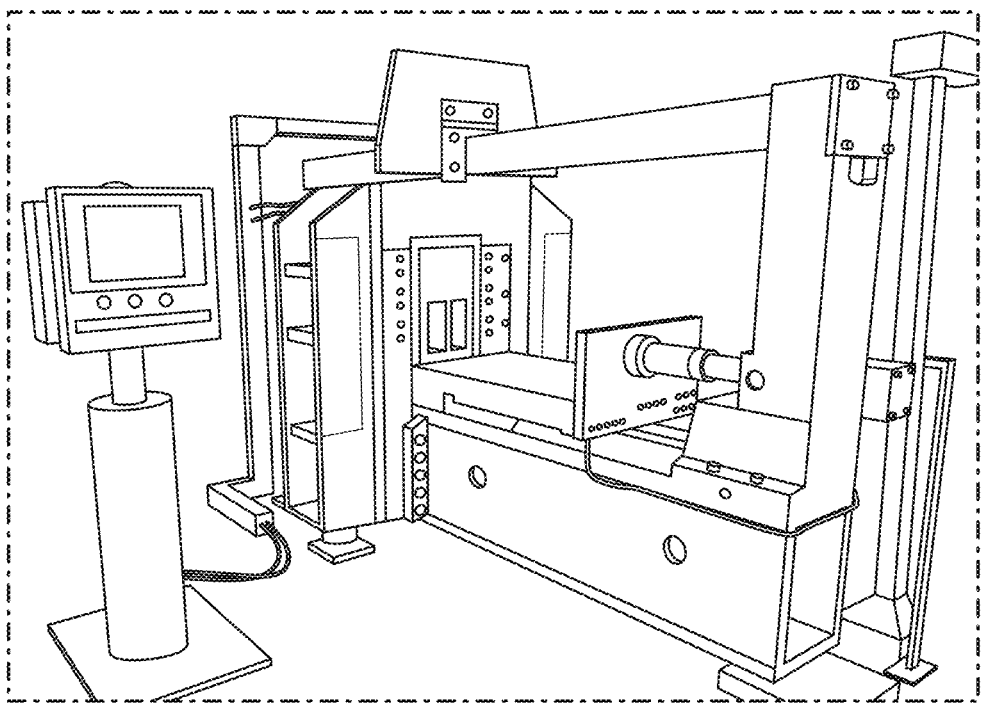
— 1502
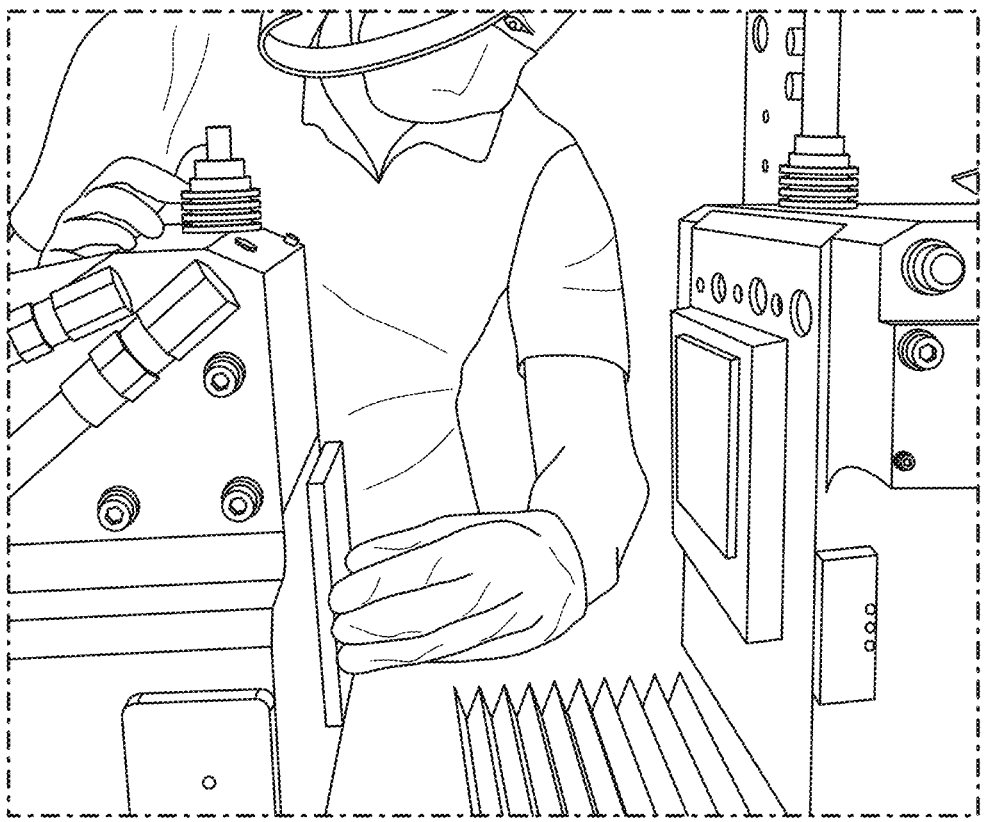
FIG. 15

A Successfully Joined GRE/PEEK Component

LFW PEEK (Left) and GRE (Right) Weldments Before Welding.
The GRE Weldment Has Been Grit Blasted.

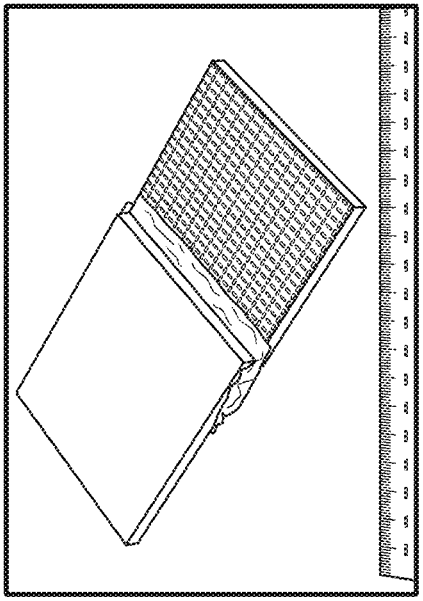
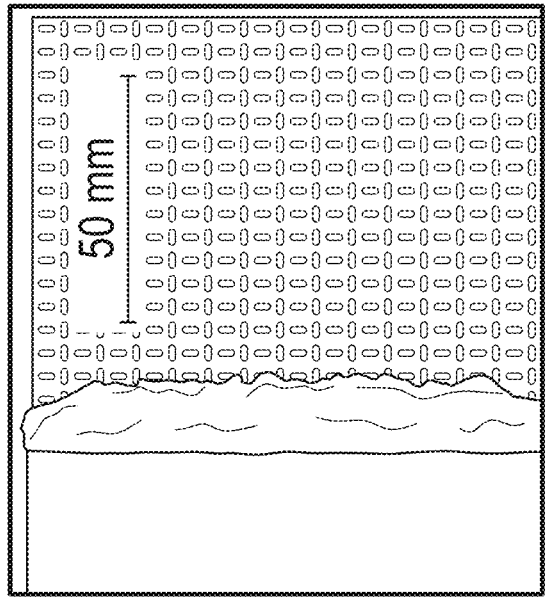
FIG. 21A
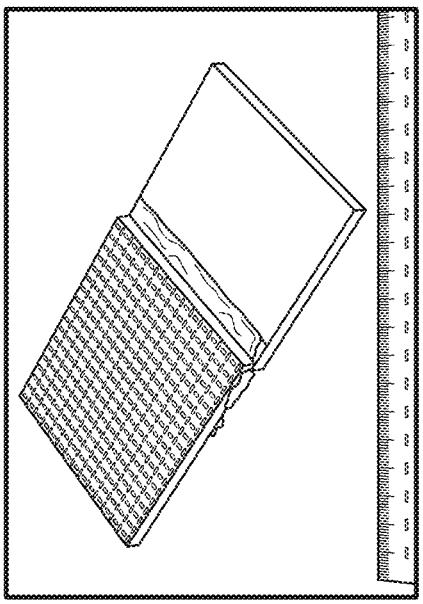
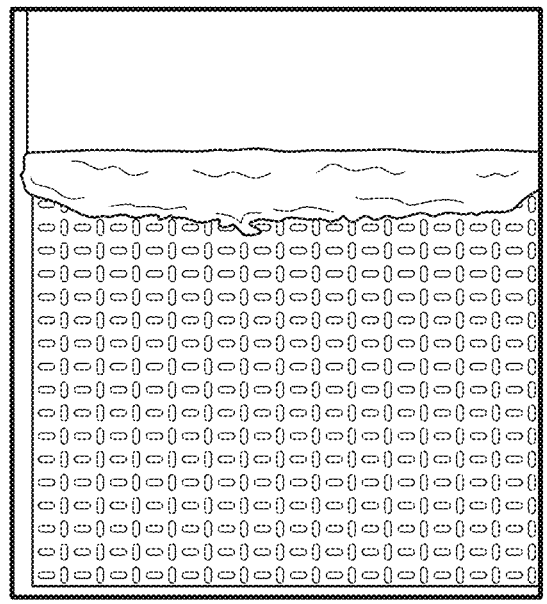
FIG. 21B
FIG. 22

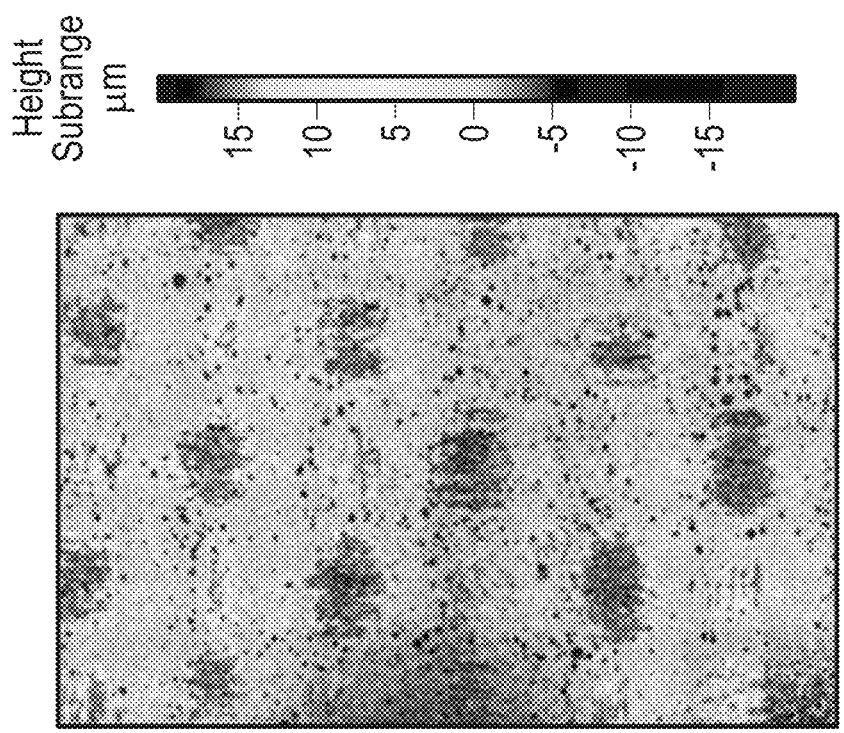
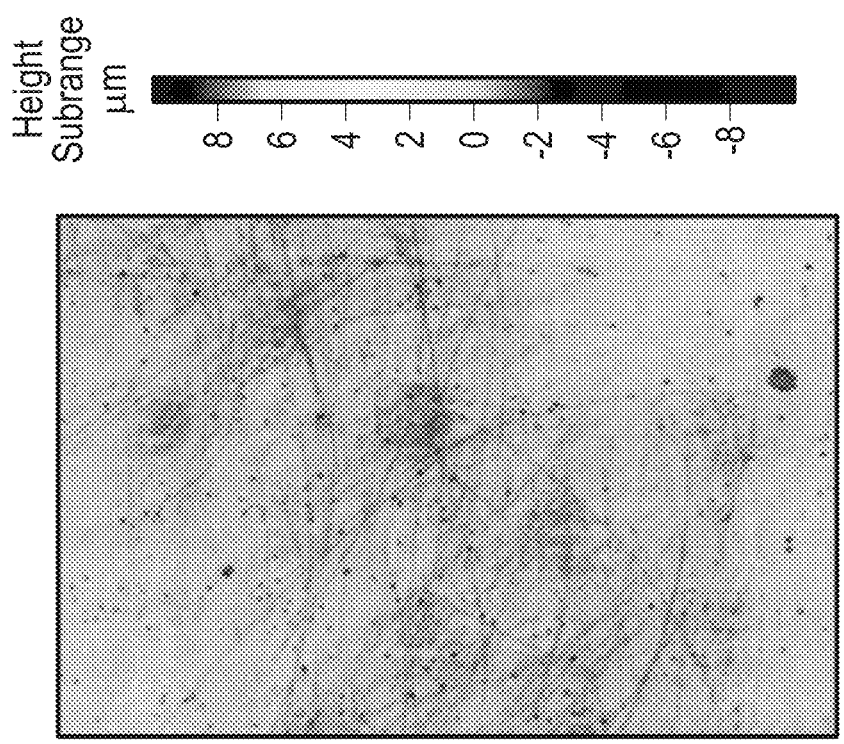
FIG. 29

APPARATUS AND METHOD FOR BONDING TIE LAYERS ON REINFORCED THERMOSETTING RESIN LAMINATES FOR USE IN WELDING THERMOSET COMPOSITE PIPE JOINTS

BACKGROUND OF INVENTION

RTR (Reinforced Thermosetting Resin) pipe is an acronym given to a broad family of fiber reinforced thermosetting pipes manufactured via a filament winding process. The reinforcement is generally glass fiber and the resin (matrix) is a thermoset polymer, traditionally polyester, vinyl-ester, or epoxy depending on the nature of the transported fluids in the pipe and the service temperature. This has led to the development of 3 main product lines for RTR pipes: GRP (Glass Reinforced Polyester), GRV (Glass Reinforced Vinylester) and GRE (Glass Reinforced Epoxy) pipes.

RTR pipes are generally produced in rigid segments of about 10-12 meters in length and transported onsite before being eventually assembled (jointed) to each other to the required length. The historical development of RTR began with the need to replace heavy concrete and steel pipes used in utilities and potable/sewage water systems. However, the use of RTR pipes in higher value applications such as oil and gas (O&G) service (particularly GRE), has gained a great deal of attention and acceptance. Currently, thousands of kilometers of RTR pipes are installed globally (particularly in the Middle East region) on yearly basis to meet the need of critical applications such as high pressure water injection and sour crude oil flowlines. The experience of O&G operators over the last decades has shown that RTR is a mature technology and can be an economical alternative to traditional carbon steel pipes, particularly in view of the fact that RTR pipe is not subject to the same corrosion seen in carbon steel piping. Depending on the manufacturer's product portfolio, RTR line pipes are generally available in diameters ranging from 1½" (inches) to 44" and can be designed to handle pressures ranging from 150 psi to 4000 psi and temperatures up to 210° F.

Within the RTR pipe manufacturing industry is well-known that the joint/connection in an RTR pipeline system is often the limiting component towards a higher temperature and pressure operating envelope. The envelope is often defined in terms of the product pressure in view of the diameter (i.e., larger diameter RTR pipe generally cannot handle the same pressure as smaller diameter piping). Indeed, the experience of O&G operators has shown that most failures/leaks in RTR pipe systems are associated with joint failures. This could potentially reduce the confidence in the material and technology.

A number of proprietary joint designs have been developed over the years by the manufacturers, which can generally be grouped into two main types/categories; adhesive/bonded joints and interference joints. The former, adhesive/bonded joints, relies on an adhesive (or a laminate in case of wrapped/laminated joints) to transfer the load from one pipe to another and the performance/limitation of such joints is often associated with proper surface preparation, particularly in field conditions. The latter, interference joints, relies on a solid contact and direct load transfer between the two RTR pipes to be jointed, such as threaded and key-lock joints. A combination of both techniques (i.e, adhesive and interference) is also possible (e.g., the Injected Mechanical Joint—IMJ).

In general, high-pressure RTR pipes make use of interference or mechanical joints (threaded or key-lock joints), while lower pressure ratings can be achieved with adhesive and laminate joints. Examples of interference joints are shown in FIG. 1A, which shows an integral threaded joint, FIG. 1B, which shows a coupled threaded joint, and FIG. 2, which shows a key-lock joint. Referring to FIG. 1A, the joint 100 is formed between a first RTR pipe 102 having a threaded spigot end and a second RTR pipe 104 having a threaded socket end. Referring to FIG. 1B, a joint 110 is formed between a first RTR pipe 112 having a threaded spigot end and a second RTR pipe 114 also having a threaded spigot end by employing a coupler pipe 116 having threaded socket ends. Referring to FIG. 2, joint 200 is formed between an RTR pipe 202 having a spigot end and an RTR pipe 204 having a socket end using locking strips 206 and a rubber sealing (O-ring) 208.

SUMMARY OF INVENTION

One or more embodiments of the present invention relate to a system for coupling pipes comprising: a first pipe having a tapered, spigot end; and a second pipe having a tapered, socket end adapted to internally receive the tapered, spigot end of the first pipe; wherein the first pipe and the second pipe are made from a reinforced thermosetting resin (RTR) material, wherein a thermal joining process is used to bond a thermoplastic material onto the RTR material of the first pipe or the second pipe, wherein, upon application of thermal heating to the thermoplastic material, the heat is sufficient to melt the thermoplastic material such that, when the heat is removed, the hardened thermoplastic material seals the first pipe to the second pipe.

One or more embodiments of the present invention relate to a method of coupling a first pipe having a tapered, spigot end and a second pipe having a tapered, socket end adapted to internally receive the tapered, spigot end of the first pipe, wherein the first pipe and the second pipe are made from a reinforced thermosetting resin (RTR) material, the method comprising: disposing a thermoplastic material onto the RTR material of the first pipe or the second pipe; employing a thermal joining process to bond the thermoplastic material on the RTR material, inserting the first pipe into the second pipe; and heating the first pipe or the second pipe sufficiently to melt the thermoplastic material such that, when the heat is removed, the hardened thermoplastic material seals the first pipe to the second pipe.

One or more embodiments of the present invention relate to a system and a method of coupling the first pipe and the second pipe that may include a coupler made of RTR material, wherein a thermal joining process is used to bond a thermoplastic material onto the RTR material of the coupler.

Other aspects and advantages of the invention will be apparent from the following description and the appended claims.

BRIEF DESCRIPTION OF DRAWINGS

Prior Art FIGS. 1A and 1B show an integral and a coupled threaded joint, respectively.

Prior Art FIG. 2 shows a key-lock joint.

Prior Art FIG. 3 shows a schematic representation of overloading failure of threaded RTR connections.

FIG. 15 shows details of the Thompson E20 linear friction welding machine in accordance with one or more embodiments of the invention.

FIGS. 21A and 21B shows a linear friction weld of PEEK to GRE laminate, where both sides are shown in (a) and (b) in accordance with one or more embodiments of the invention.

FIG. 22 shows PEEK to GRE friction welds after trimming excess PEEK in accordance with one or more embodiments of the invention.

FIG. 29 shows pseudo-color images of height profile for manually abraded (left) and grit blasted GRE surfaces (right) in accordance with one or more embodiments of the invention.

DETAILED DESCRIPTION

Figure 4:
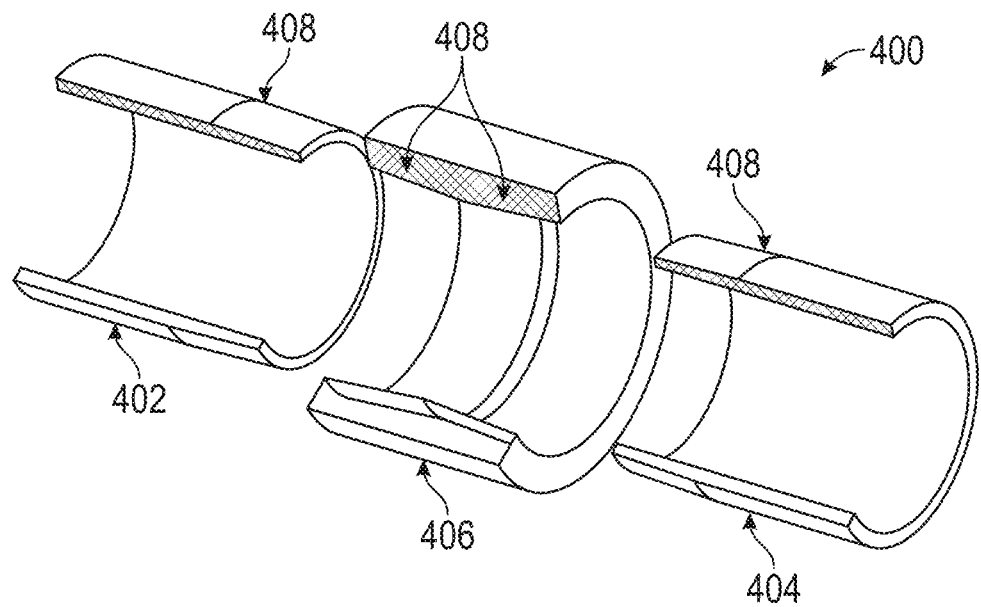
FIG. 4 is a schematic view of a coupled weldable RTR joint in accordance with one or more embodiments of the invention.

Threaded joints are traditionally used for high pressure RTR pipes. These can be either "integral" (i.e., a connection that does not use a joining member/coupler to transfer the load from one pipe to the other) or using a "coupler." Although threaded joints can achieve outstanding performance, in terms of pressure rating and sealing capacity, the experience of O&G operators has shown that failures can happen. The general opinion is that the failures are associated with improper installation by the jointers (pipe misalignment, over-torqueing, improper/insufficient taping of the thread compound—TEFLON® (registered trademark of the Chemours Company FC, LLC), etc.).

A typical failure mechanism is illustrated in FIG. 3. A poor installation can result in imperfections/cavities along the contact surface between the spigot and the socket. In operation, fluid (e.g., water) at high pressure and high temperature could ingress into these cavities (step #1) and create a high pressure fluid film (step #2) which would slowly propagate along the spigot-socket interface. In some cases, the creep of the resin at the interface can aggravate the water propagation at the interface. As the ingress progresses, the contact pressure on the initial threads is eliminated and the excess load is transferred to the nearby threads, which eventually leads to overloading failure (step #3).

One or more embodiments of the present invention introduce a new jointing technique that will reduce, and potentially eliminate, failures and increase the confidence in the RTR pipe technology. The ultimate target for such embodiments is to replace current jointing technologies for RTR pipes (low and high pressure) with a maximum operating envelope up to 24 inches at 1500 psi pressure rating and service temperatures up to 230° F.

Therefore, one or more embodiments of the present invention relate to a system and method for jointing of high pressure reinforced thermosetting resin (RTR) pipes. The present inventors have invented methods and systems involving using an electrofusion welding process, also referred to as resistive implant welding, to result in electrofusion welded joint without any threads. Additionally, the present inventors have invented method and systems involving system and method for jointing of high pressure reinforced thermosetting resin (RTR) pipes using a friction welding process to result in a friction welded joint without any threads. Additionally, the present inventors have invented method and systems involving a combination of two conventional jointing techniques: integral threading, or threading to a coupler, followed by thermoplastic welding, resulting in threaded-welded joints.

Each of these systems and methods may involve jointing (1) two "weldable" RTR pipes with tapered spigot ends coated with a tie layer (interlayer) comprising at least a thermoplastic material and (2) a "weldable" RTR pipes with tapered socket ends coated with a tie layer comprising at least a thermoplastic material, or alternatively a reinforced thermoplastic coupler comprising at least a thermoplastic material. Detailed descriptions of such recent inventive work by the present inventors is appended in the form of provisional patent applications directed to each particular type of system and method of jointing.

In the context of the continued inventive work by the present inventors, one or more embodiments of the present invention relate to techniques for bonding tie layers on reinforced thermosetting resin laminates for use in welding thermoset composite pipe joints. More specifically, one or more embodiments of the present invention relate to a system and method for a specific structure of a thermoplastic material tie layer that can be used to bond reinforced thermosetting resin (RTR) laminates via thermal welding processes along with different methods for the deposition of the disclosed tie layer structure on the faying surfaces of RTR laminates. It is to be noted that the welded thermoplastic tie layer can also be used as a sealing system only (i.e., combined to another jointing process—e.g., threaded to get the mechanical strength required—while the sealing function is fulfilled by the welded part).

In accordance with one or more embodiments, a first method consists of thermal spray deposition of an aluminum layer on the faying surfaces of the to-be-jointed RTR laminates, followed by the deposition of a polyether ether ketone (PEEK)-based tie layer on the aluminum substrate using either thermal spraying or thermal joining process. The aluminum interlayer is used to increase the adhesion of the PEEK-based tie layer to the RTR laminate and could also serve the purpose of a conducting electromagnetic susceptor, if induction is used as the heating method for the subsequent thermal welding of the RTR pipes. In accordance with one or more embodiments, a second method is based on direct deposition of the PEEK-based tie layer on the faying surface of the RTR laminates using a thermal joining process such as a friction-based method or resistive implant heating method.

At the outset, it is noted that while PEEK is suggested as a suitable thermoplastic material in one or more embodiments, those skilled in the art will readily appreciate that the same techniques can be used for any other weldable thermoplastic materials traditionally used in the O&G industry (such as polyethylene (PE), polyvinylidene fluoride (PVDF), polyphenylene sulfide (PPS), polyaryletherketone (PAEK), polyamide (PA), etc.). Further, when used on RTR pipe and coupler ends, the systems and methods disclosed in the embodiments below will enable the modified pipes and couplers to be subsequently jointed and sealed in the field using any thermal welding technique commonly used for joining thermoplastic pipes.

The appendix to this disclosure includes details of jointing and sealing concepts (systems and methods) for RTR pipes using a variety of thermal welding techniques. Those techniques rely primarily on adding a "welding" functionality to the RTR pipes (known to be not weldable) using a thermoplastic interlayer deposited on the faying surfaces of the to-be-jointed RTR pipes. It will be appreciated by those skilled in the art that the systems and methods of one or more embodiments involve related structures.

Figure 5:
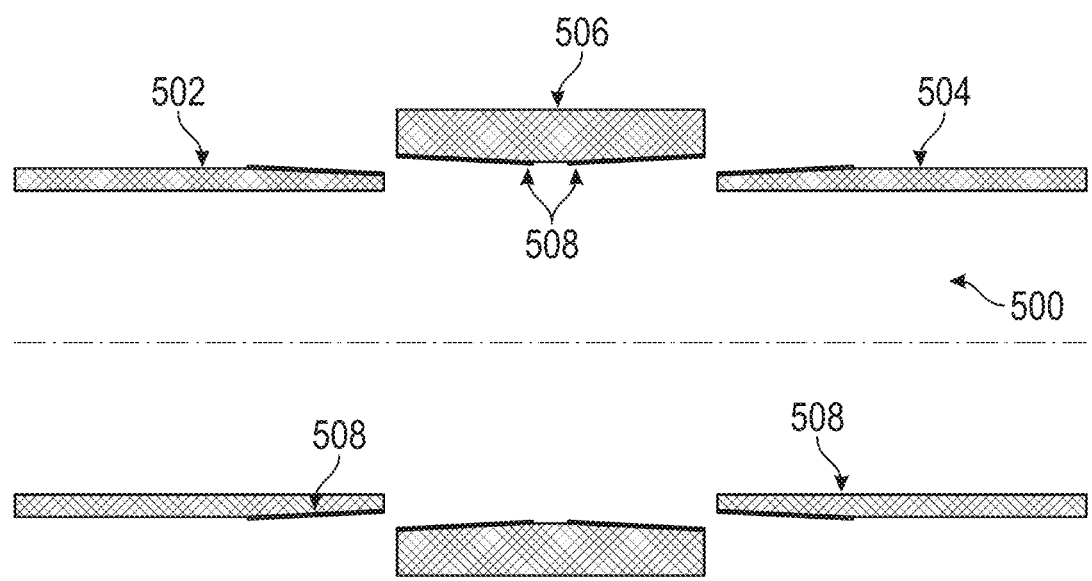
FIG. 5 is a schematic cross-section representation of a coupled weldable RTR joint in accordance with one or more embodiments of the invention.

An exemplary system in accordance with one or more embodiments is schematically presented in FIG. 4 and FIG. 5. As can be seen, a joint 400 is being formed between a first RTR pipe 402 with a tapered spigot portion (end) coated with a tie layer comprising at least a thermoplastic material (tie layer A) 408 and a second RTR pipe 404 with a tapered spigot portion (end) coated with a tie layer comprising at least a thermoplastic material (tie layer A) 408 by employing a reinforced thermoset (RTR) coupler pipe 406 with a tapered socket portions (ends) coated with a tie layer comprising at least a thermoplastic material (tie layer B) 408.

In one or more embodiments, and as shown in FIG. 5, at least one tie layer is used to joining at least two RTR pipes. In some embodiments, a joining process may include thermal joining of at least two RTR pipes to which at least one tie layer material has been added on each RTR surface.

Generally, one or more embodiments relate to bonding a thermoplastic layer (which may include metallic susceptors, if needed) on the RTR pipes 402, 404 and coupler 406 ends, which should preferably be done at the pipe manufacturing stage. It should be noted that the same concept can be used for integral joint, i.e., no need for a coupler in the middle as it is integrated into one of the two pipes. At the installation site, the "functionalized" pipes and coupler are pushed into each other and subsequently jointed by applying sufficient heat (e.g., by induction, friction, or resistive welding process) to melt and fuse the thermoplastic layers to each other. Upon cooling, a fully bonded and sealed joint is formed. Accordingly, in one or more embodiments, relevant methods for the deposition and bonding of thermoplastic tie layers onto the RTR pipe ends are disclosed.

Those skilled in the art will appreciate various methods can be used to apply and bond the tie layers to the thermoset parts. Several techniques, such as thermal spraying a thermoplastic powder on the faying surface of the thermoset parts (with sufficient surface preparation, e.g., sand blasting) or applying a thermoplastic implant while the thermoset is in a partially cured (or uncured) state, followed by co-curing at the required temperature (below the melting temperature of the thermoplastic) may be employed in different embodiments. In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

The thermoplastic materials 408 used on the tie layers can either be the same or different in A and B, but must necessarily be weldable to each other (e.g., have very close melting/solidification temperatures and be melt compatible, i.e., mix well when molten). In addition, such thermoplastic materials must be carefully selected to ensure their function throughout the lifetime of the pipe (typically, 25 years). For example, the materials must be qualified (e.g., as per ISO 23936) to meet the service specifications in terms of design temperature, pressure, and chemical compatibility with the environment (acidic gases, liquids, aromatics contents, etc.). Examples of thermoplastics that can be considered, include but are not limited to (i.e., non-exhaustive list), are high-density polyethylene or HDPE, polyethylene of raised temperature (PE-RT), PVDF, PEEK, polyetherketoneketone PEKK, polyamide 12 (PA12), polyketone (POK) among other thermoplastic resins commonly used in the O&G industry.

One or more embodiments of the present invention relate to a specific structure of a PEEK-based tie layer that can be used to bond reinforced thermosetting resin laminates (here glass fiber reinforced epoxy—GRE) via thermal welding processes, and; two different methods for the deposition of the disclosed tie layer structure on the faying surfaces of RTR laminates.

Figure 6:
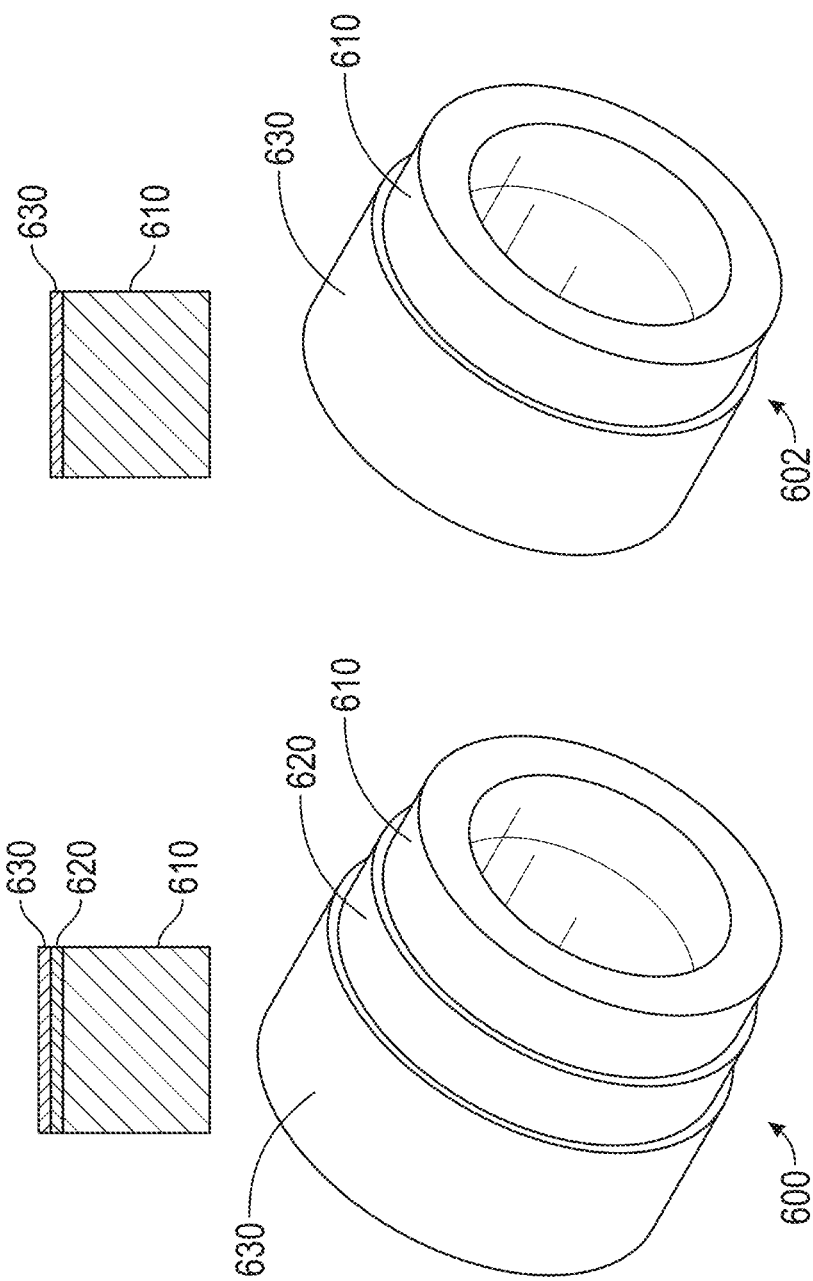
FIG. 6 is a schematic view of examples of tie layer composition in accordance with one or more embodiments of the invention: Tie layer A (left) using an aluminum interlayer and Tie layer B (right) without interlayer.

The specific tie layer disclosed in this invention is PEEK-based and schematically presented in FIG. 6 when applied on the surface of a GRE pipe (example only). Two variants of the tie layer are presented: Tie layer A (left) using an aluminum interlayer 600—Tie layer B (right) without interlayer 602.

Tie layer A (left) 600, which has a sandwich structure and includes an initial adhesion promoting interlayer 620 (e.g., aluminum, a functionalized aluminum with silanes or zircoaluminates) deposited onto the RTR laminate 610 and a second layer of PEEK material 630 deposited on top of the adhesion promoting layer 620. In the case of the adhesion promoting interlayer 620 being an aluminum interlayer, this may also serve the purpose of a conducting electromagnetic susceptor if induction is used as the heating method for the subsequent thermal welding process.

Tie layer B (right) 602 is simply a layer of PEEK material 630 deposited directly onto the surface of the RTR laminate 610.

Figure 7:
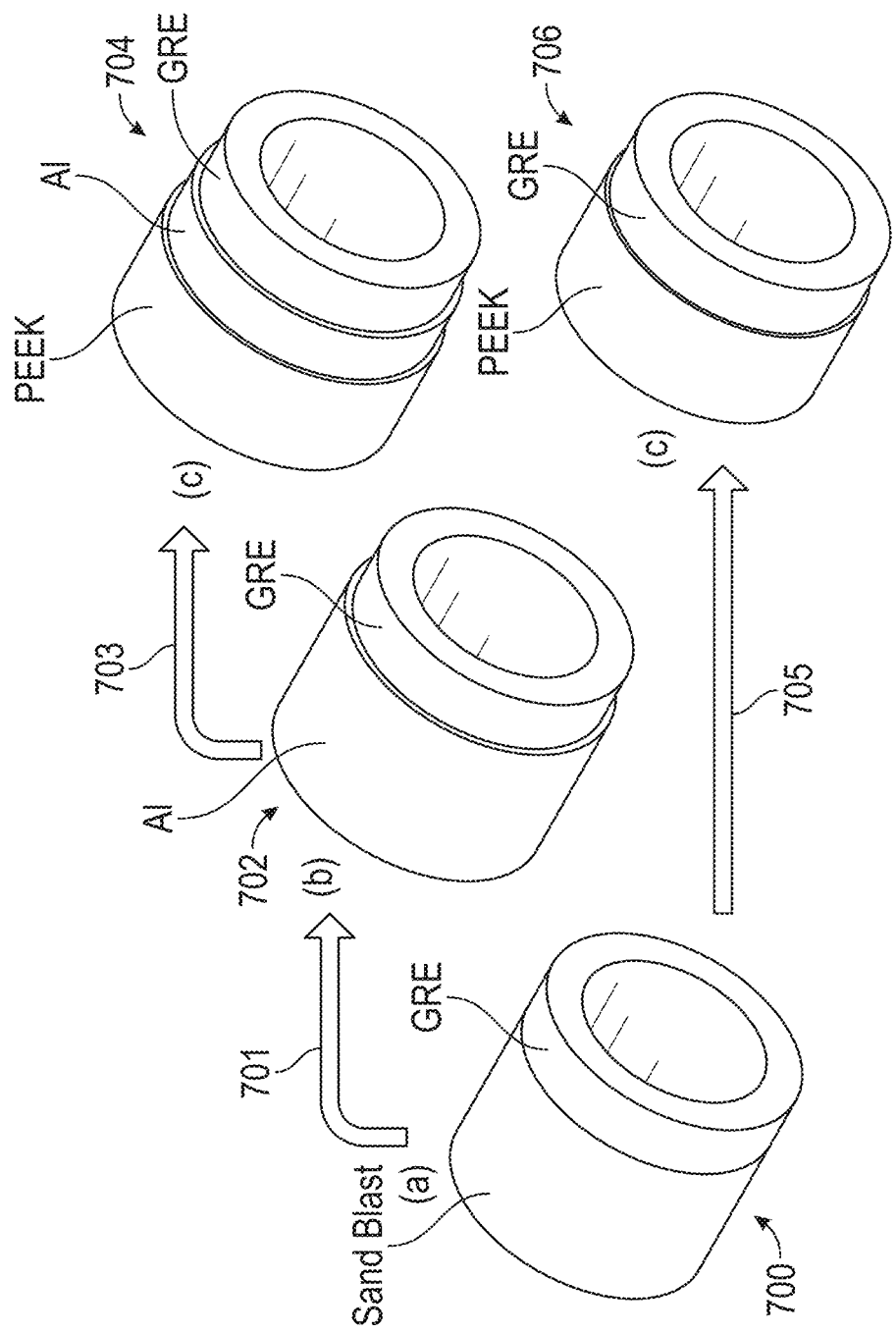
FIG. 7 is a schematic description of the method used to assemble the system using friction welding in accordance with one or more embodiments of the invention.

FIG. 7 shows a description of the tie layer deposition method(s) with a sand blasted GRE pipe 700, an aluminum coated GRE pipe 702, a PEEK layer deposited onto an aluminum coated GRE pipe 704, and a PEEK coated directly onto the GRE pipe 706. The main steps involved in the deposition of the PEEK-based tie layer (A and B) disclosed in the previous section are illustrated in FIG. 3 when applied on the GRE pipe (taken as an example). The deposition techniques used can be either through a thermal spraying route, a thermal joining route, or a combination of both.

The choice of adopting Tie layer A or Tie layer B will be made based on (i) whether an aluminum intermediate layer is required to act as a susceptor in the subsequent thermal joining process (such as induction), (ii) whether an aluminum layer is acceptable considering the final application of the pipe joint, and (iii) whether the subsequent thermal joining process required a PEEK tie layer thickness greater than achievable using a thermal spray process.

In the first step (a) 701 and 705, the faying surfaces of the RTR laminate are prepared using a suitable process such as sand/grit blasting. Care should be taken not to cause damage to the fibres in the GRE materials to obtain a sand blasted GRE pipe 700. The surfaces are then cleaned to remove dust and debris.

For tie layer A, in the second step (b) 703, a layer of aluminum is deposited onto the surfaces prepared in step (a) using a thermal spraying process to obtain an aluminum coated onto the sand blasted GRE pipe 702. If the aluminum layer is required to improve the adhesion of the subsequent tie layer then it must be applied in sufficient thickness to achieve the intended strength improvement. If the purpose of the aluminum layer is to act as an electromagnetic susceptor then its thickness must be sufficient to act as an effective susceptor and facilitate induction heating required to effect the subsequent joint between pipes and coupler.

In step (c), a PEEK layer is applied using an appropriate process to obtain a PEEK layer deposited onto a GRE pipe 706 or an aluminum coated GRE pipe 704. This can be a thermal spray process or a thermal joining process (such as a friction-based method or resistive implant heating method). After the tie layer has been applied, it may be machined to the correct dimension required for the correct alignment and fit of the pipes and coupler. Steps (a) to (c) would ideally be carried out at the pipe/coupler manufacturing facility where suitable equipment is located and since the surface preparation of a substrate often conditions the final quality of a coating, a clean and controlled environment (e.g., dust free, temperature regulation, etc.) might be required, which is easier to achieve in the manufacturing site.

Step (a)—Surface Preparation

A GRE laminate was grit blasted with 60 mesh white alumina grit at 60 psi (pounds per square inch) using a Guyson Model 400 suction blast gun. The laminate surface was cleaned with compressed air to remove dust, followed by solvent degreasing using Industrial Methylated Spirit (IMS) solvent to remove any surface contaminant. This process results in a sand-blasted GRE pipe 700 in FIG. 7.

Step (b)—Thermal Spraying of Aluminum Intermediate Layer

Figure 8:
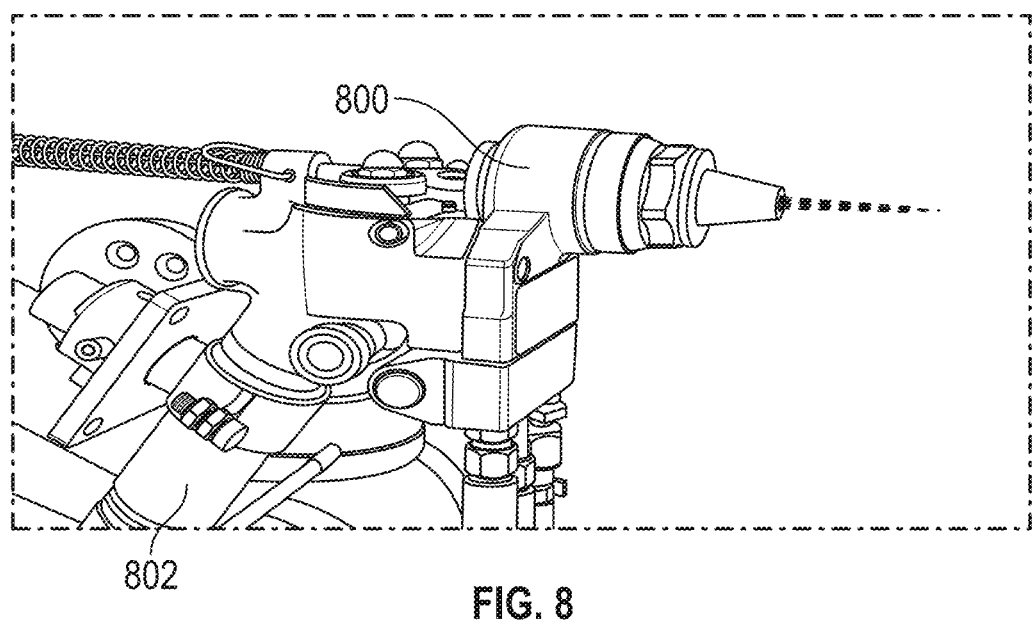
FIG. 8 is a metallization gun used for the deposition of an aluminum layer in accordance with one or more embodiments of the invention.

After the GRE laminate surface had been adequately prepared, aluminum was deposited by the wire flame spray (WFS) process using a Metallisation M73 flame spray gun 800, as shown in FIG. 8, mounted onto a robotic arm 802. The coating was deposited to a thickness of approximately 100 μm (micron) using 2.3 mm (millimeter) diameter aluminum wire, 01E (1050/1350), procured from Metallisation Ltd. Deposition parameters were selected based on experience of spraying aluminum onto composites and are presented in Table 1.

TABLE 1

| Aluminum coating wire flame spray parameters | |
|---|---|
| Parameter | Value |
| Oxygen flow rate, L/min (liters per minute) | 95 |
| Propane flow rate, L/min | 13 |
| Air flow rate, L/min | 450 |
| Traverse speed, mm/s (millimeters per second) | 1000 |
| Increment, mm | 8 |
| Number of passes | 2 |

Step (c)—Thermal Spraying of PEEK Tie Layer

Figure 9:
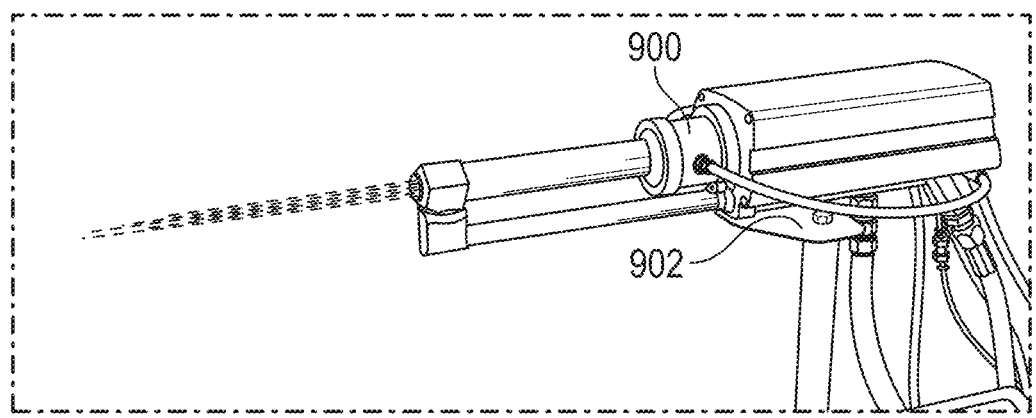
FIG. 9 is a HVOF gun used for the deposition of PEEK on the aluminum substrate in accordance with one or more embodiments of the invention.
Figure 10A:
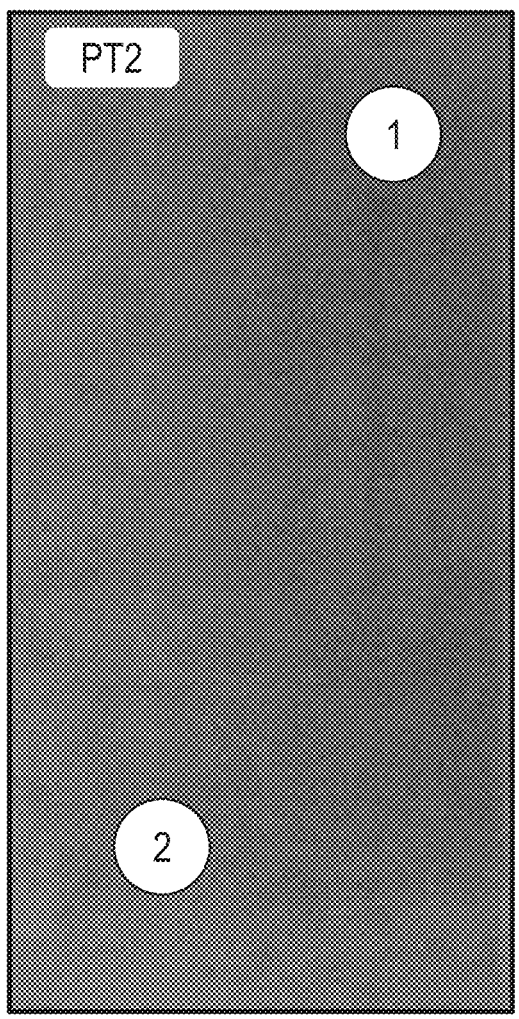
FIGS. 10A and 10B are a PEEK layers thermally sprayed by a first and second technique respectively in accordance with one or more embodiments of the invention.
Figure 10B:
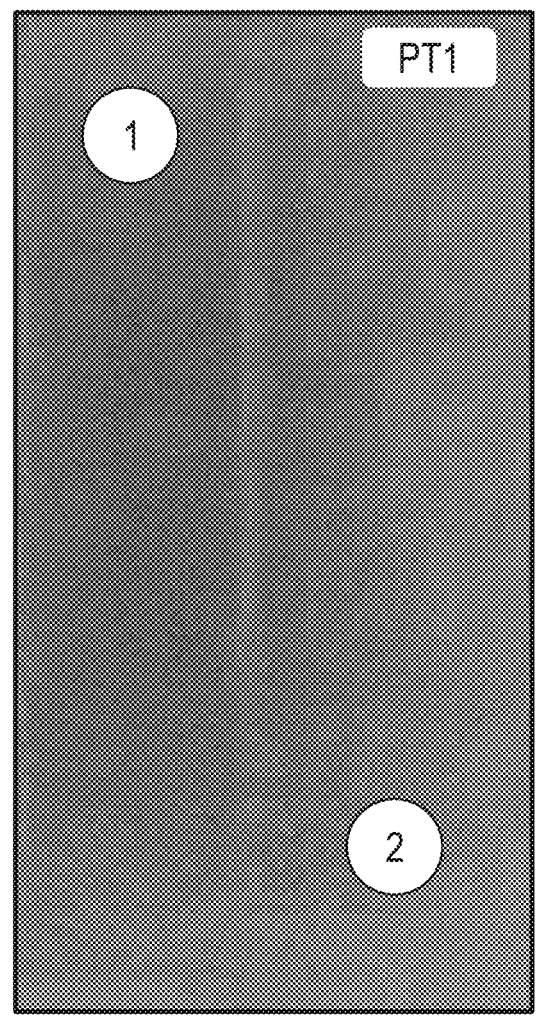
Figure 11A:
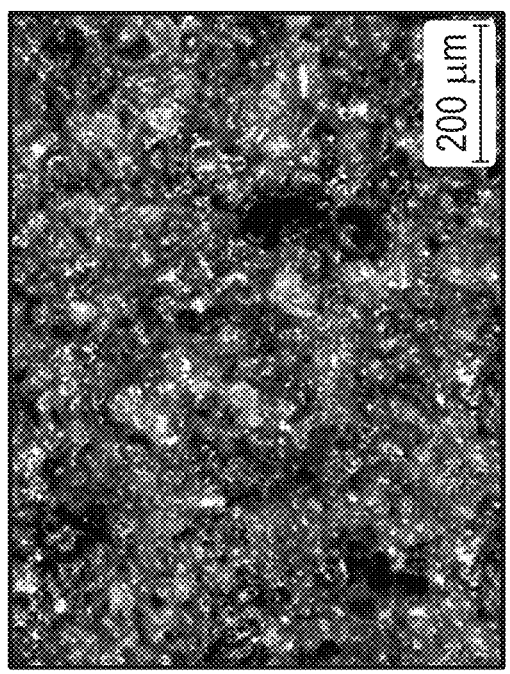
FIGS. 11A-11D are optical micrographs of thermally sprayed PEEK/aluminum surfaces in accordance with one or more embodiments of the invention.
Figure 11C:
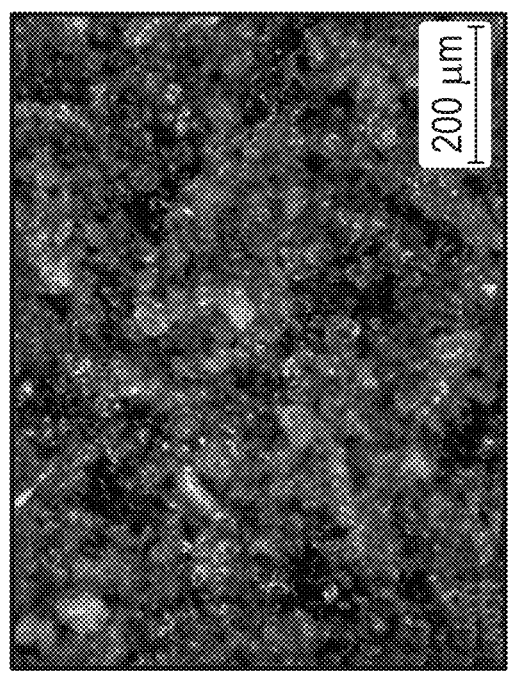
Figure 11B:
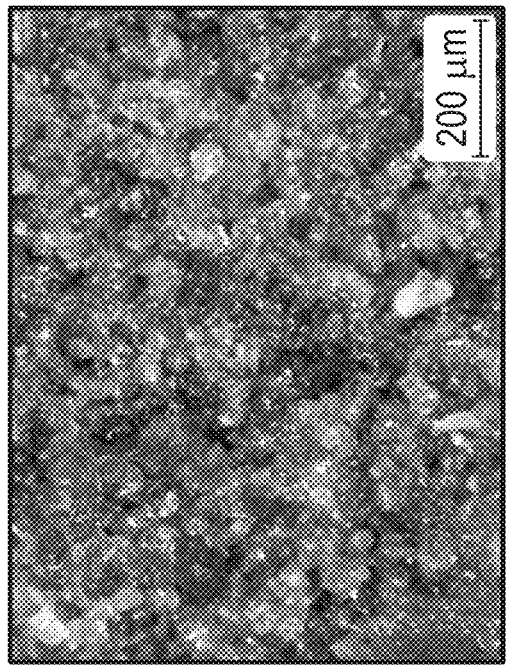
Figure 11D:
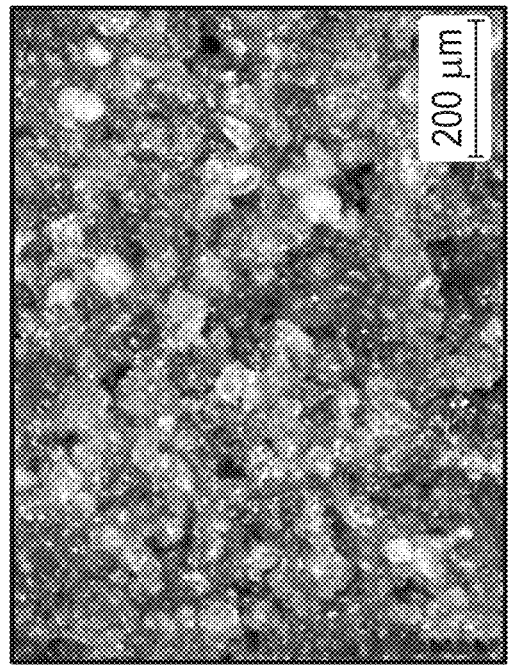
Figure 12A:
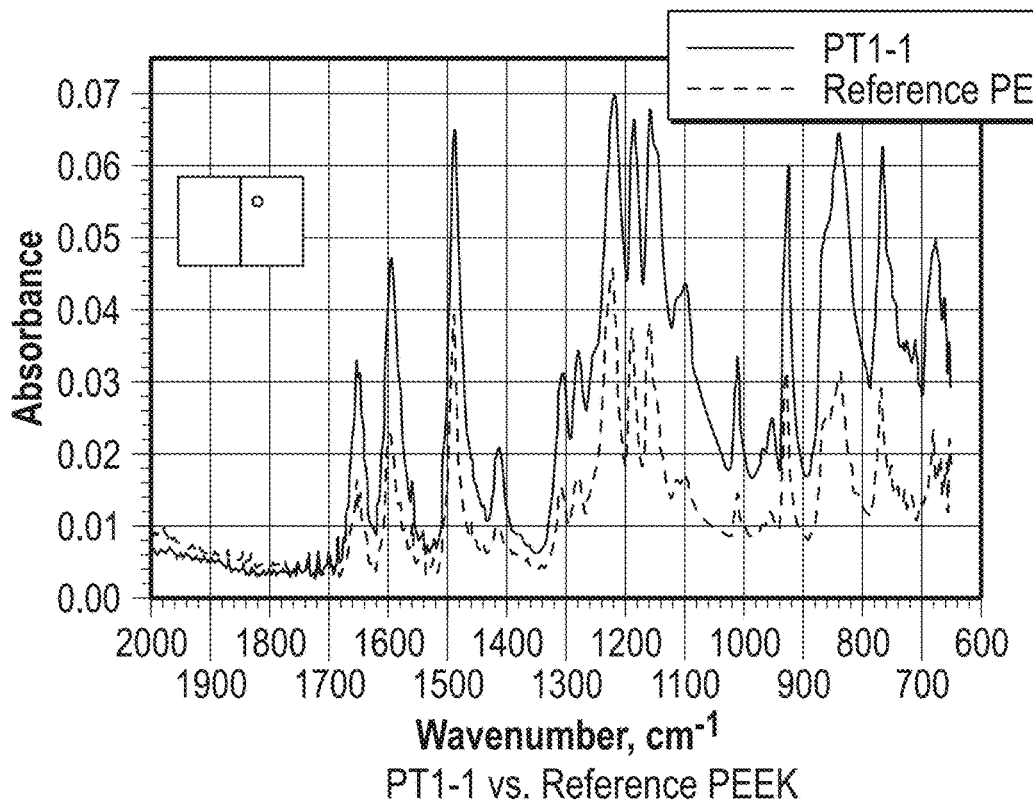
FIGS. 12A-12D are graphs in accordance with one or more embodiments of the invention.
Figure 12B:
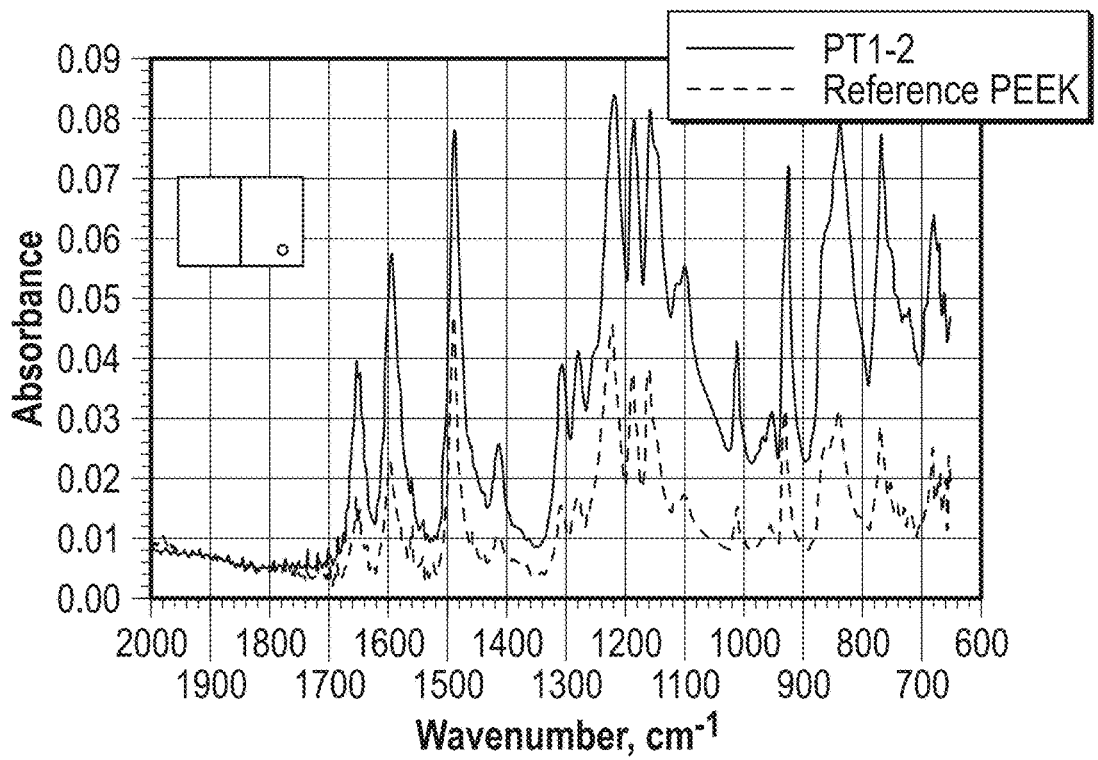
Figure 12C:
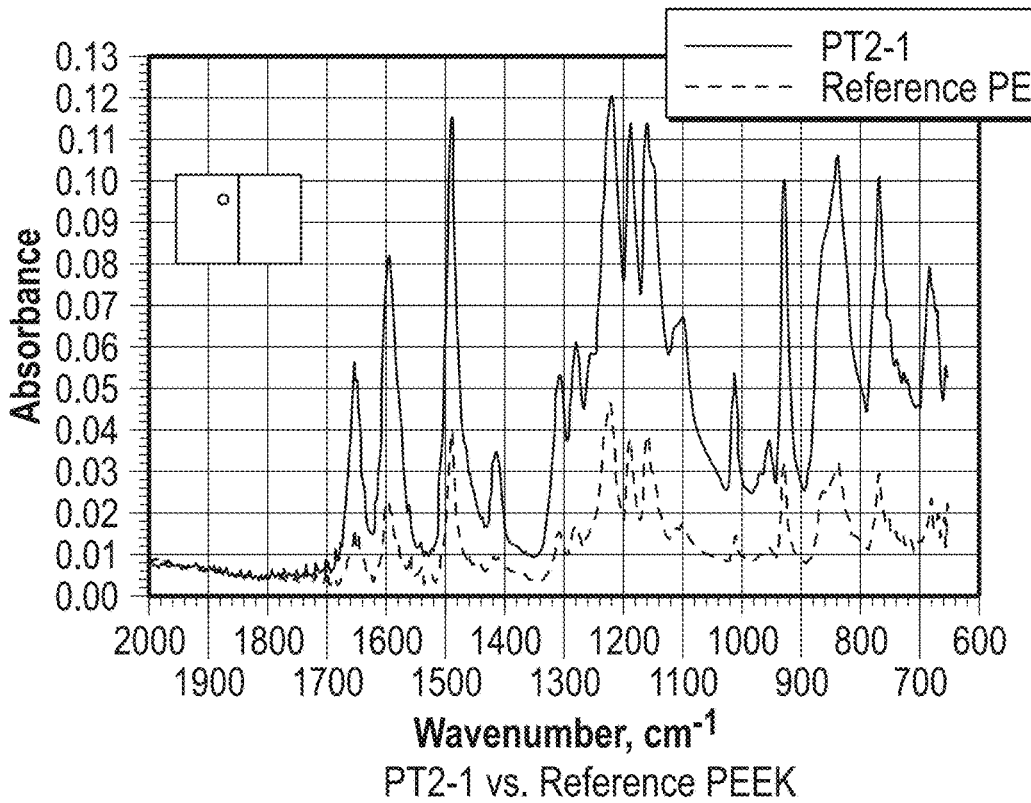
Figure 12D:
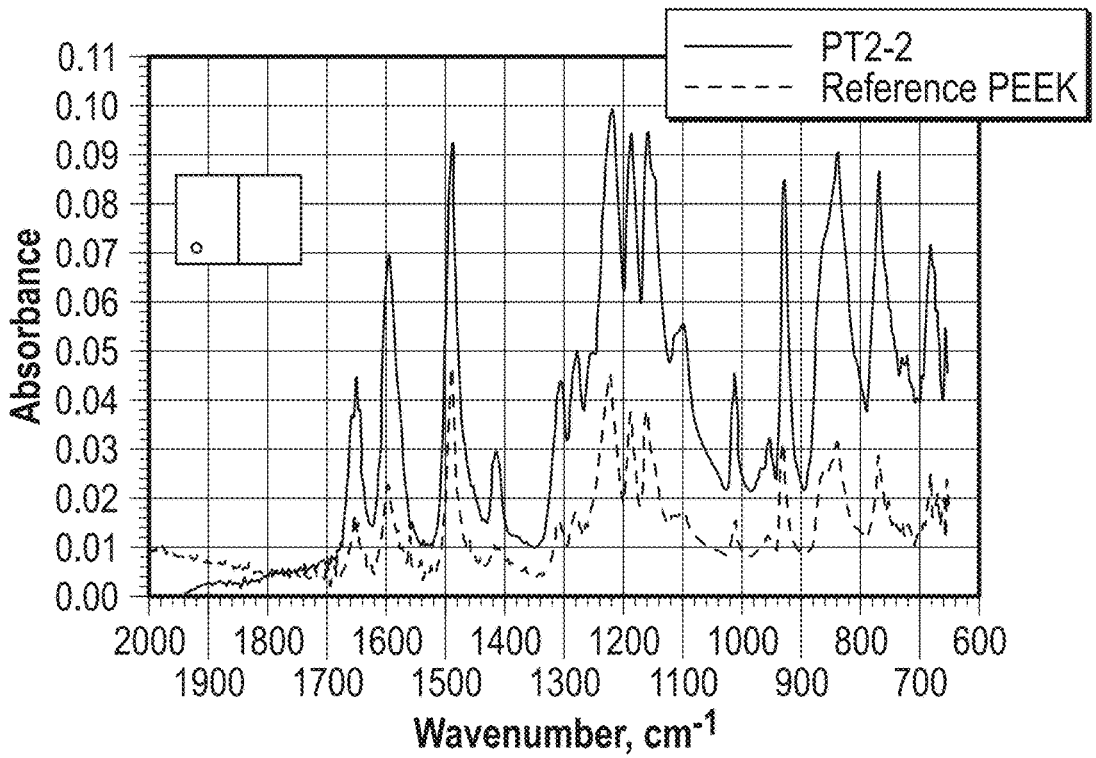

The aluminum coated GRE laminate 702 or the uncoated GRE laminate 700 was subsequently coated with an additional layer of a thermoplastic polymer (PEEK) to obtain a PEEK coated onto an aluminum coated GRE pipe 70443. Following a series of spraying trials, the final PEEK coating was deposited over the aluminum coating 702 by high velocity oxygen-fuel spraying (HVOF) using a Praxair TAFA JP5000ST gun 900, as shown in FIG. 9 mounted onto a robotic arm 902. Two different trials have been performed, namely PT-1 and PT-2 as shown in FIGS. 10A and 10B. Nominal 300 μm coatings were deposited using Vestakeep® (registered trademark of Evonik Operations GmbH) 4000FP PEEK powder (D50 ca. 60 μm), procured from Evonik Industries. Deposition parameters are presented in Table 2.

TABLE 2

| PEEK coating HVOF parameters | |
|---|---|
| Parameter | Value |
| Oxygen flow rate, L/min | 300 |
| Kerosene flow rate, L/min | 200 |
| Powder gas flow rate, L/min | 13.2 |
| Traverse speed, mm/s | 800 |
| Increment, mm | 5 |
| Number of passes | 24 |

Characterization of the Tie Layer

A number of techniques were employed to characterize the quality of the sprayed PEEK coating on the GRE laminates:

Visual Inspection

Visual inspection of the thermally sprayed PEEK coating indicated light and dark regions PT1 and PT2 as shown in FIGS. 10A and 10B. Two locations from each half of the sprayed laminate were selected for characterization: PT1-1, PT1-2, PT2-1 and PT2-2. Results of the initial trials of spraying PEEK onto the laminate are presented in FIGS. 10A, 10B. The area treated using conditions PT2, 1000 in FIG. 10A, appear slightly darker than that treated using PT1, 1002 in FIG. 10B.

Optical Microscopy

The surface of the sprayed PEEK laminates was examined under a Leica DMR optical microscope with digital images captured using Leica image capture software. Images captured contained automatic scale bars calibrated for the lens in use at the time. Optical micrographs of the four investigated areas (labeled a-d) are presented in FIGS. 11A-11D, which reveal no marked degradation of the PEEK coating.

Chemical Analysis

An Agilent ExoScan Fourier Transform Infrared (FTIR) spectrometer was used to analyze the sprayed PEEK coating, and a sample of Vestakeep® (registered trademark of Evonik Operations GmbH) powder in order to establish whether thermal spraying had caused any degradation of the PEEK. FTIR absorbance spectra for the two areas of PT1 (areas 1 and 2 in FIG. 10B) and the two areas of PT2 (areas 1 and 2 in FIG. 10A) for the PEEK/aluminum sprayed laminate are presented in FIG. 12A-12D. In each figure, the absorbance spectrum for the PEEK coating is shown in comparison to a reference spectrum taken with pure PEEK powder. In all four areas, PT1-1 (area 1 in FIG. 10B), PT1-2 (area 2 in FIG. 10B), PT2-1 (area 1 in FIG. 10A), and PT2-2 (area 2 in FIG. 10A), there is good correlation between the sprayed PEEK and original PEEK powder (reference material). There is no apparent thermal degradation of the PEEK coating in any area.

Adhesion Strength

Figure 13:
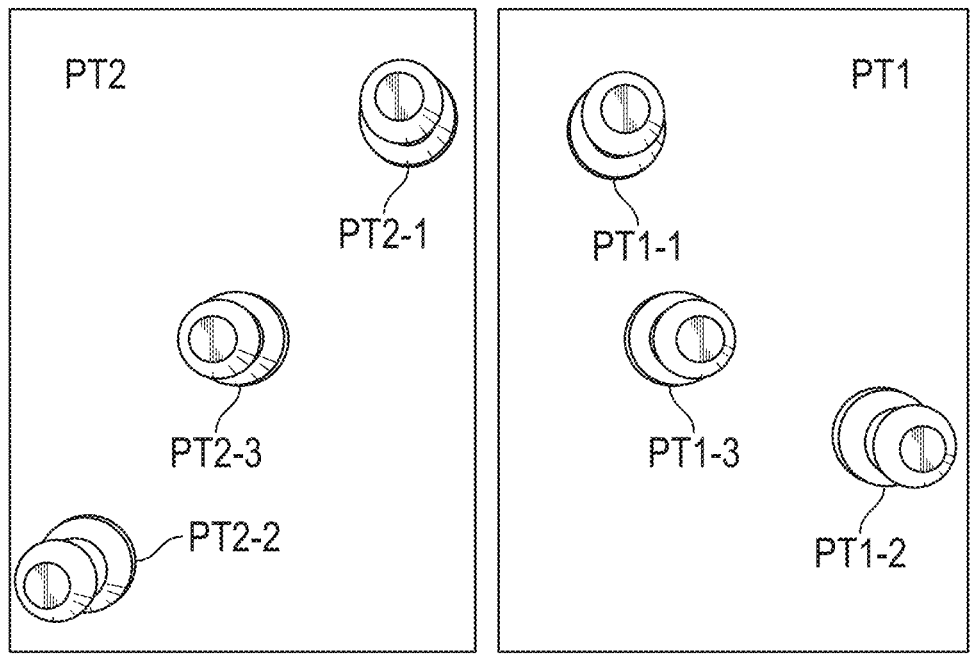
FIG. 13 shows the location of adhesion tests with 20 millimeter dollies bonded onto the PEEK/aluminum coated laminates in accordance with one or more embodiments of the invention.

An adhesion pull-off test was used to assess the overall adhesion strength of the thermally sprayed PEEK to the aluminum layer and of the aluminum layer to the GRE laminate. Three locations from each of the PT1 areas of the PEEK/aluminum coated laminate were selected, as shown in FIG. 13. The PEEK coated areas were cleaned with Methyl Ethyl Ketone (MEK) solvent. The base of each 20 mm diameter dolly was grit blasted, air blasted and cleaned with MEK. The dollies were bonded using Araldite Epoxy 2014-2 adhesive and were cured at 40° C. for 16 hours.

Pull-off testing was carried out using an Elcometer 510 Automatic Pull-Off Adhesion Gauge, according to the guidelines in BS EN 24624. Load was applied at a rate of 0.7 MPa per second.

Figure 14:
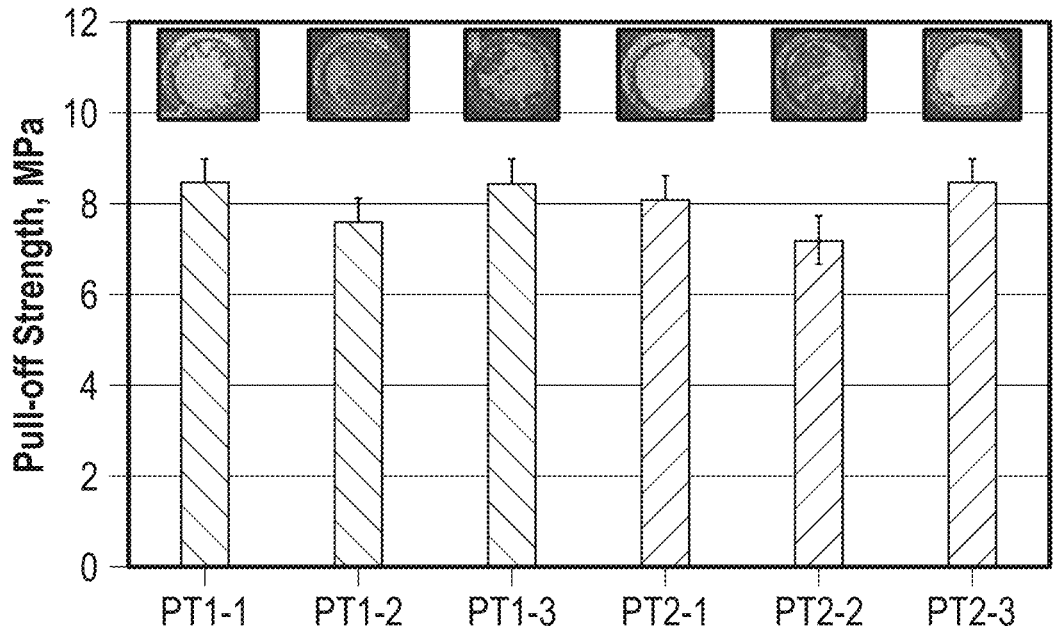
FIG. 14 shows adhesion pull-off strength results for area PT1 and PT2 with corresponding images of failures in accordance with one or more embodiments of the invention.

The Adhesion pull-off strength results are presented in FIG. 14 and Table 3. The adhesion quality of the PEEK coating is not only evaluated from pull-off strength values. The failure mode can also provide valuable information. FIG. 14 shows associated failure modes for each pull-off test, and reveals the varied failure modes observed. Adhesion of the coated PEEK was determined to be approximately 8 MPa (megapascals). However, failure modes revealed a mixture of PEEK/aluminum and aluminum/GRE failure modes.

It is worth noting that pull-off testing measures the adhesion performance of a coating when loaded in out-of-plane tension; potentially the most severe loading mode. However, when used in a process to join pipes, the PEEK layer would not experience such a loading mode, and is more likely to suffer from Mode II, shear failure as the internal pressure causes the pipes to separate from the coupler. Although there is no clear correlation between Mode I and Mode II strength and the pull-off strength values should not be used for prediction of the joint strength, a pull-off strength of 8 MPa will generally indicate a well bonded coating and does not raise any concerns regarding the integrity and strength of the produced joints.

TABLE 3

Adhesion pull-off strength for PEEK sprayed/aluminum sprayed laminate.

| | Location PT1 | Pull-off strength, MPa PT2 |
|---|---|---|
| 1 | 8.48 | 8.11 |
| 2 | 7.63 | 7.24 |
| 3 | 8.46 | 8.50 |
| Mean | 8.19 | 7.95 |
| Standard deviation | 0.396 | 0.527 |

Technical Feasibility of Tie Layer B (Thermal Joining Route)

Step (a)—Surface Preparation

Surface preparation is important in friction welding components as it not only contributes to both the means of adherence between the faying materials, but also the frictional properties of the faying surfaces and therefore the rate at which frictional heat is generated in the joining process.

The direct bonding of a thermoplastic material (here PEEK) onto an RTR laminate (here GRE) 706 using a thermal joining process such as Linear Friction Welding (LFW) is a new process. The technical feasibility of the tie layer structure and deposition techniques disclosed above is detailed with reference to a specific example of an embodiment of the present invention. The parameters and equipment described in the specific example are illustrative only and should not be considered as restrictive elements to the present invention.

The surface of the GRE laminates was prepared using a manual abrasion process following the guidelines specified in EN 13887:2003 (E) "Guidelines for surface preparation of metals and plastics prior to adhesive bonding," Section 6.1 "Physical: Mechanical (Scarification)" as follows:

Using 180 grit (76 micron) abrasive paper:
Abrade straight across in a convenient direction until all the surface has been lightly and uniformly scarified then;
Abrade similarly, at right angles until all traces (from Step (a) above) have been obliterated then;
Abrade by means of a circular (<10 mm diameter) motion until, again, all traces of the foregoing (see b) above) have been obliterated and the surface appears uniform;
Remove debris. If dry abraded, and if practical, use a vacuum. Otherwise, blow clean oil free and dry air in a suitably ventilated enclosure. If wet abraded, solvent wipe using a clean lint free cloth and allow to dry;
The surface of the PEEK material was prepared by milling PEEK blocks to the required geometry to fit the linear friction welding machine tool. No additional finishing or abrasion was carried out on the PEEK material prior to welding, other than a wipe with Isopropyl alcohol (IPA) immediately before joining. A representative example of surface abrasion is presented in FIG. 19.

Step (b)—Friction Deposition of Peek Tie Layer

Friction welding of a PEEK layer onto the surface of a GRE laminate 1502 was carried out using Thompson E20 linear friction welding machine 1500, using a tool designed to hold two 6 mm thick 90 mm×100 mm adherence. The welding parameters (forge pressure, oscillation amplitude and frequency, and weld time) are presented in Table 4 and were selected based on previous experimental trials and programmed into the E20 settings to ensure repeatable welding conditions. An example of non-limiting welding parameters shown in Table 4 are referred to herein as "Program 1." In all welds, the GRE component 1500 was held in the oscillating side of the tool, whereas the PEEK component 1502 was placed in the forging side of the tooling, as shown in FIG. 15.

TABLE 4

Linear friction welding parameters

| | |
|---|---|
| Weld time, s (seconds) | 10 |
| Oscillation amplitude, mm | ±1.5 |
| Oscillation frequency, Hz (Hertz) | 50 |
| Force, kN (kilonewtons) | 87 |
| Forge burn-off, mm | 4.5 |

Figure 16:
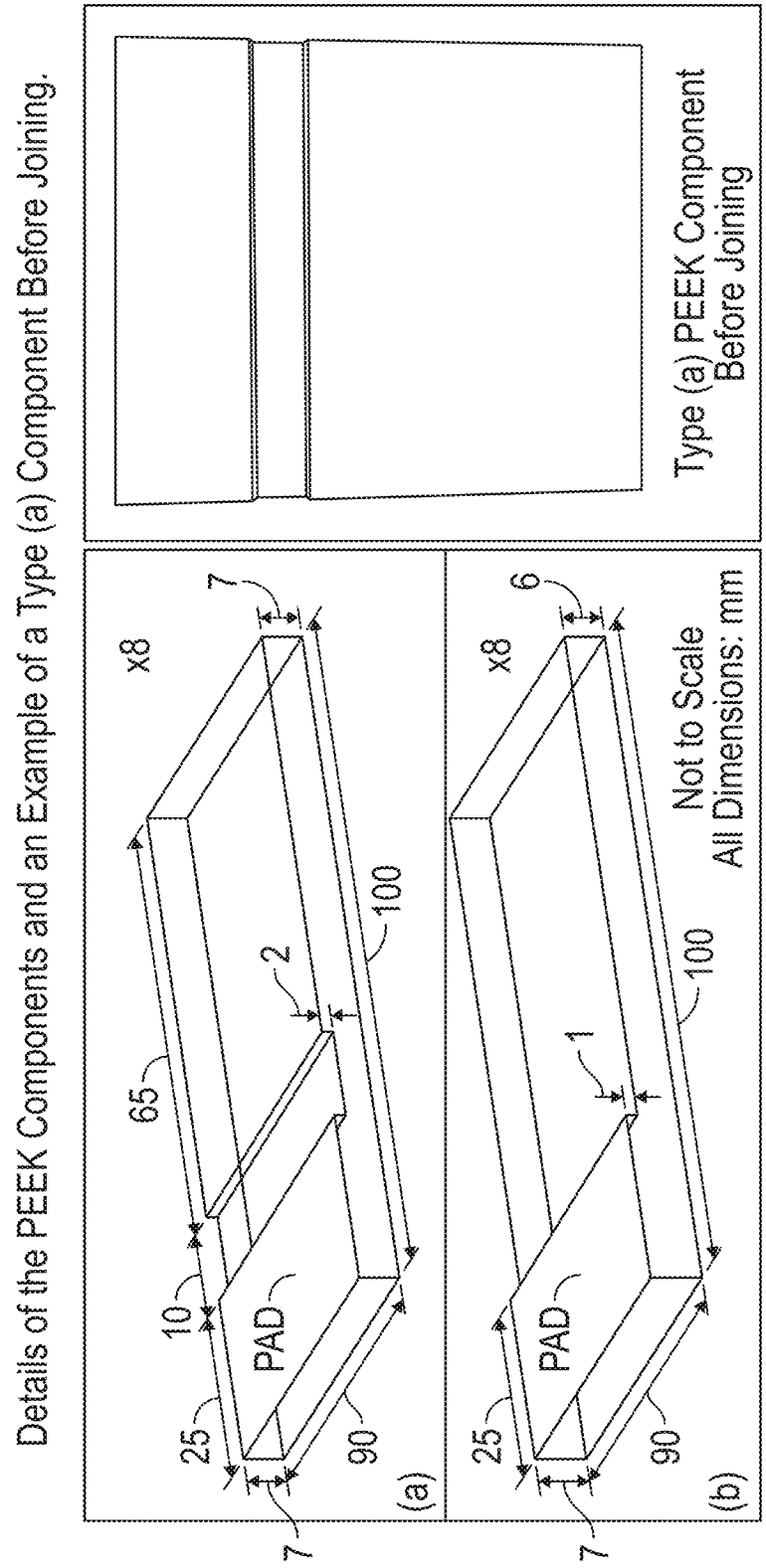
FIG. 16 shows details of the PEEK components and an example of a type (a) component before joining in accordance with one or more embodiments of the invention.

The PEEK component 1502 was prepared with either a 10 mm wide by 1 mm deep notch located 25 mm from the faying surface, or the faying surface being 2 mm proud of the remainder of the component, as shown in FIG. 16. This was to provide a fixed size pad faying surface, and to provide space for the forged PEEK flash material to flow into during joining.

Figure 17:
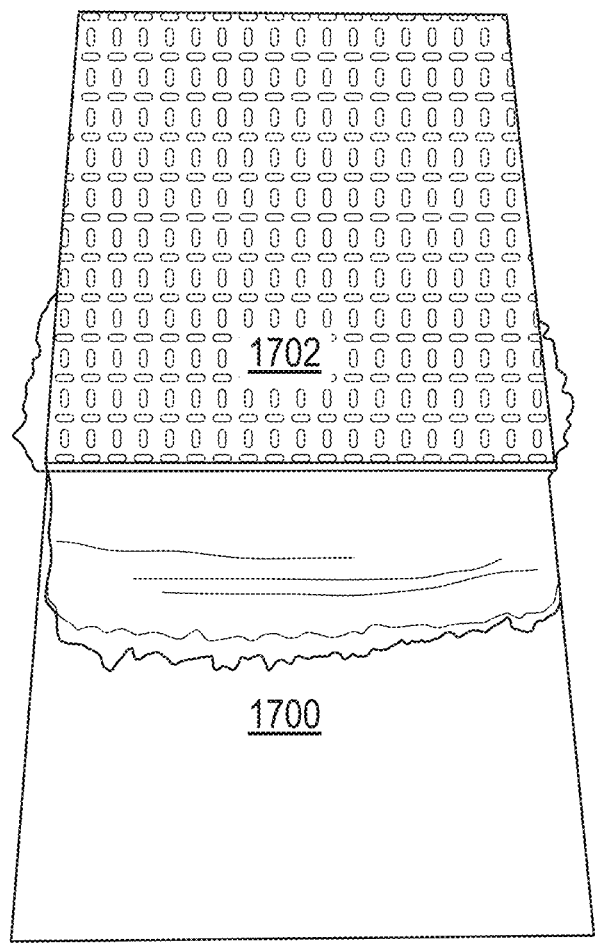
FIG. 17 shows a successfully joined GRE/PEEK component in accordance with one or more embodiments of the invention.
Figure 18:
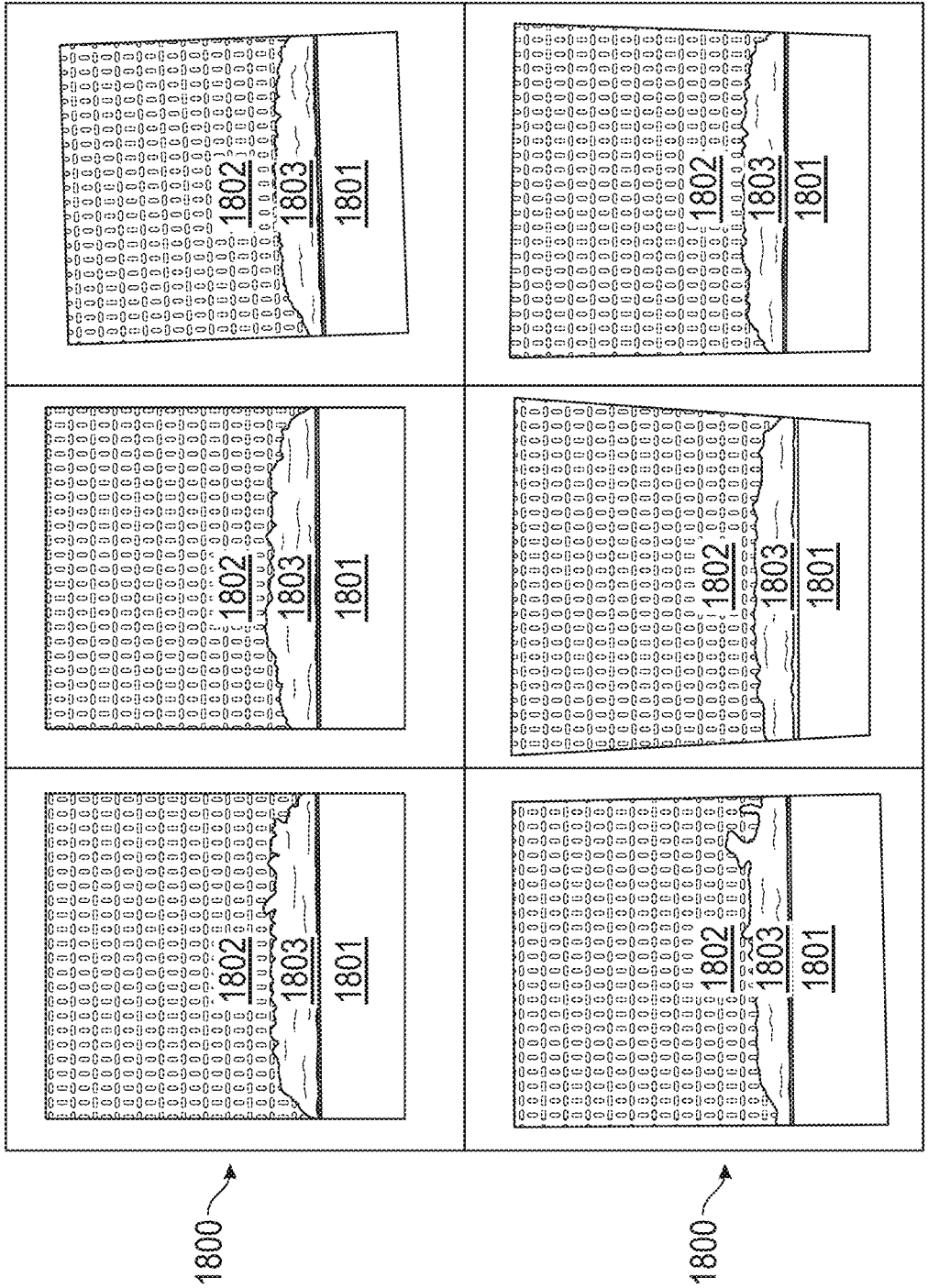
FIG. 18 shows GRE laminates with friction deposited PEEK tie layers in accordance with one or more embodiments of the invention.

After the joining cycle had been completed the joined components (PEEK 1702 on GRE 1700) were removed from the tooling, as shown in FIG. 17, before being milled to the correct geometry by removing the flash, the excess PEEK and reducing the PEEK layer thickness to 1 mm, as shown in FIG. 18 with a PEEK layer 1802 on GRE 1801. The thickness of the PEEK layer 1802 can be varied depending on the requirements of the subsequent thermal joining process. For linear friction welding this has been suggested as being 1 mm, allowing for up to 1.5 mm forge burn-off to occur and leave a 0.5 mm weld line thickness 1803. Resistive implant welding can operate successfully with thinner layer as there is no forging phase in the welding process.

The PEEK-coated GRE laminates 1800 presented in FIG. 18 can be finally jointed to each other using a welding process (e.g, resistive implant welding or friction welding) and the resulting joint can be tested mechanically to assess the bond strength.

Those skilled in the art will appreciate that three primary limitations/challenges need to be overcome to successfully implement one or more embodiments of the invention.

(1) The thermoplastic tie layer (here PEEK-based) must be chosen to have sufficient properties to achieve both an effective joint (strength and durability) and also sealing against pipe content leakage.

(2) In such cases that include a required application of the aluminum layer, the aluminum layer may be applied as a means of improving the adhesion strength of the thermoplastic tie layer and/or acting as an electromagnetic induction susceptor, must have sufficient permeation and corrosion resistance for the selected application. Some applications may not be conducive to the presence of a thermally-sprayed aluminum layer at the joining/sealing interface.

(3) If friction is used as a means of attaching the thermoplastic tie layer then sufficient friction/heat must be generated during the welding process without damaging the underlying fiber structure. There is a delicate balance required in order to achieve a successful joint.

Surface Preparation

Surface preparation of the GRE laminate/pipe surface is a critical step to making a good (friction) weld. In another set of welds, grit blasting (GB) was carried using a Guyson 400 Syphon type gun fitted with an 8 mm nozzle, operating at 40 psi with a stand-off distance of 60 mm. A 60 mesh (250 μm) white aluminium oxide grit was used, and nozzle was traversed at approximately 50 mm/s across the specimen surface. A picture of the GRE laminate after surface preparation is shown FIG. 19 right.

Figure 19:
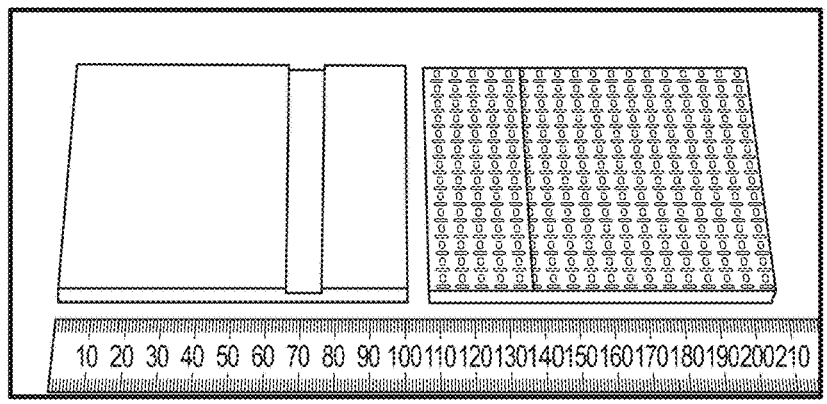
FIG. 19 shows PEEK (left) and GRE (right) weldments before linear friction welding in accordance with one or more embodiments of the invention.

GRE and PEEK weldments were cut to 90×100 mm to fit the LFW tooling. The PEEK weldment contained space outside the weld region to allow for the squeeze-out of molten PEEK during the forging stage as shown in FIG. 19 (left).

Friction welding of PEEK to GRE and PEEK to PEEK

In addition to the welding parameters described above (i.e., Program 1) an alternative friction welding program ("Program 2") which employs a more aggressive forging force and oscillations was compared to the previously described welding Program 1.

Figure 20A:
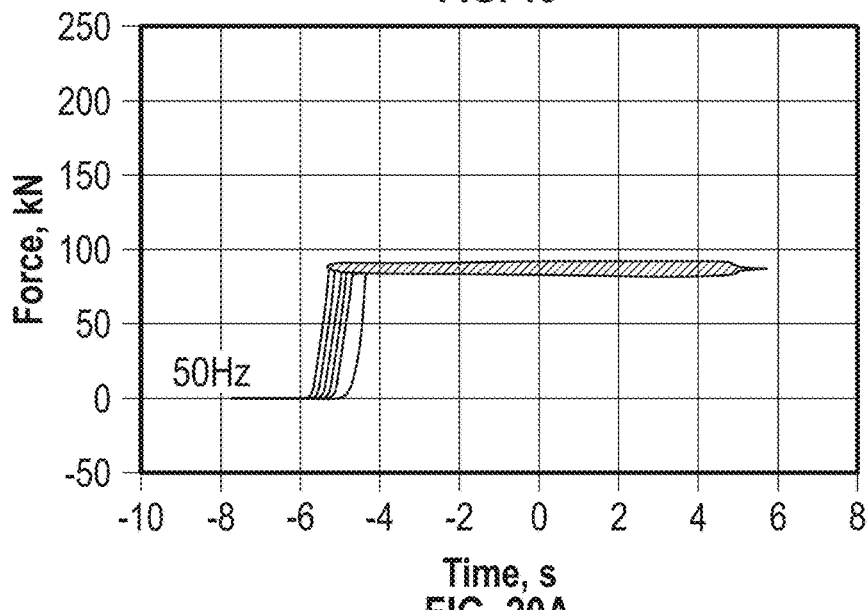
FIGS. 20A and 20B shows the welding force over time of linear friction welding Program 1 and the oscillation amplitude of the welding force (kN) versus time of linear friction welding Program 1 in accordance with one or more embodiments of the invention.
Figure 20B:
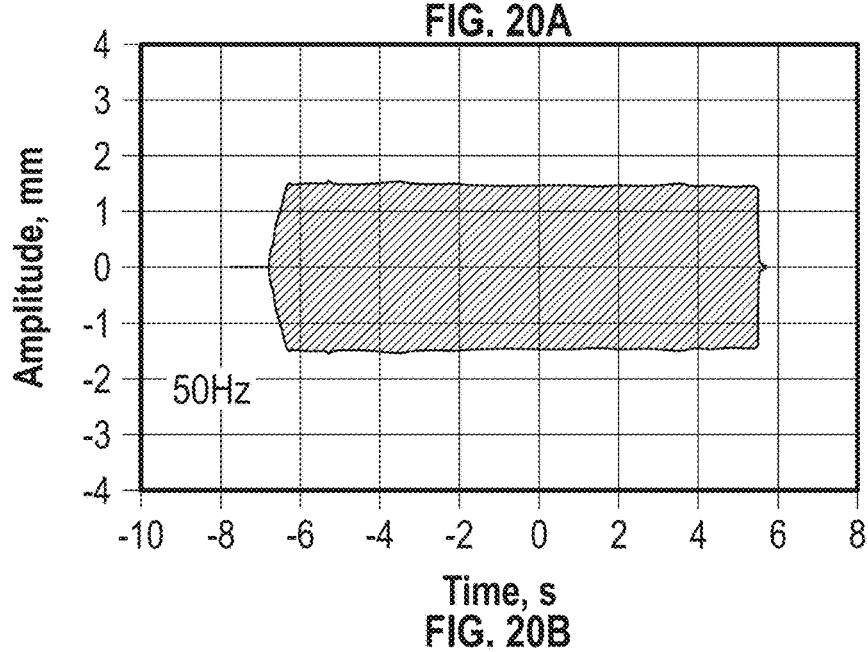

FIG. 20A shows the welding force over time of Program 1, and FIG. 20B shows the oscillation of the welding force (kN) versus time of Program 1. The make-up of the full joint (schematically illustrated on flat coupons as previously discussed is also valid for cylindrical shapes (i.e. pipes). In one or more embodiments this joining process may be completed in either in a two-step or three-step process (FIGS. 21A and 21B).

Figures 23A, 23B:
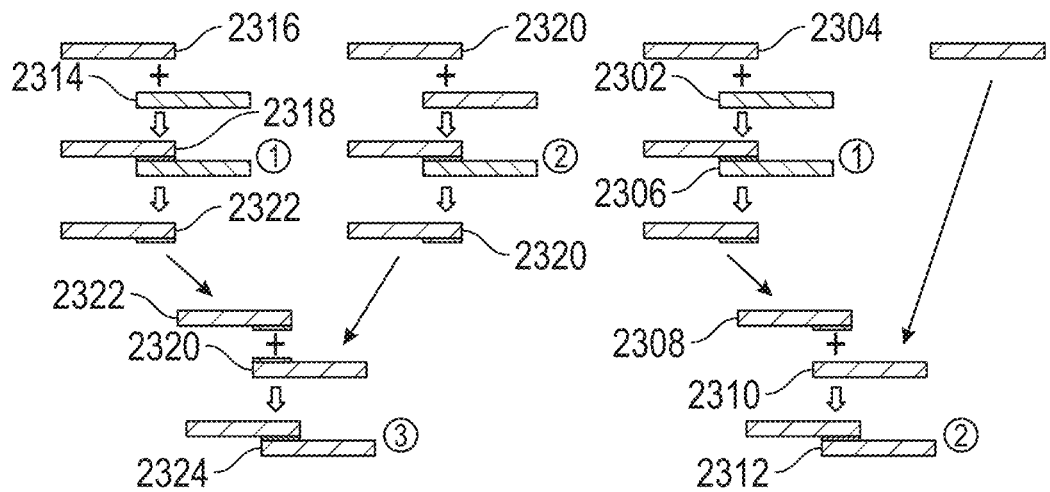
FIGS. 23A and 23B show two possible routes of joining PEEK to GRE in accordance with one or more embodiments of the invention.

Embodiments disclosed herein relate to a joining process that may be a two-step joining process (as shown in FIG. 23B) or a three-step joining process (as shown in FIG. 23A). In an exemplary embodiment, a first step of a two-step joining process includes a process in which PEEK 2302 is bonded/joined to a GRE laminate 2304 (or pipe) using a thermal joining process, such as linear friction welding following a prescribed welding program to form a weld 2306 between the PEEK 2302 and the GRE laminate 2304. Once joined, an excess amount of PEEK may be removed and milled to a nominal thickness, such as 1 mm, as needed to achieved the required Bond Line Thickness (BLT).

In a second step of the two-step process, a joint 2308 formed from the first step is joined to a second uncoated GRE laminate 2310 using a friction welding process as previously described to form a laminated part 2312. The friction welding process may be programmed with either the same or different welding parameters as used in step 1. A photograph of a resultant structure is shown in FIG. 21A.

In one or more embodiments, a three-step joining process as shown in FIG. 23A may be advantageous. A non-limiting example of such embodiments includes joining a thermoplastic tie layer (PEEK) 2314 that is bonded/joined to a GRE laminate (or pipe) 2316 using a linear friction welding process following a prescribed welding programme as a first step in the three-step process to form a weld 2318. Once joined, the excess PEEK may then be removed and milled to a nominal thickness, such as 1 mm, needed to achieve the required Bond Line Thickness (BLT).

In the second step, the same process as step 1 is repeated on a second GRE laminate with a thermoplastic tie layer (PEEK) to form a PEEK-coated GRE laminate weld 2320. In the third step, the PEEK-coated GRE laminate weld 2320 and 2322 from step 1 and step 2 are joined together (PEEK to PEEK welding) to form a laminated part 2324. The welding operation can be performed via friction welding or any other thermal welding process suitable for joining thermoplastic materials together, including, but not limited to electrofusion or implant welding.

Figure 24:
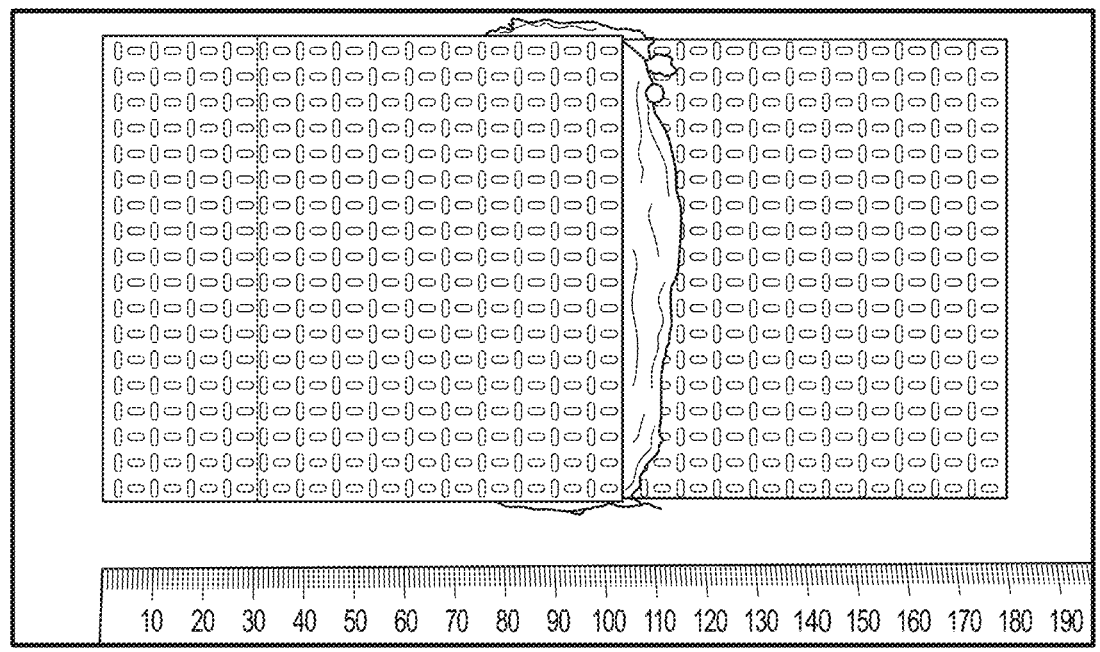
FIG. 24 shows a final three-step weld result (GRE to GRE coupon) with a PEEK to PEEK weld in accordance with one or more embodiments of the invention.

In all of the LFW joints the first stage was to join a PEEK weldment to a GRE weldment using the prescribed weld program. Once joined, the excess PEEK was removed and milled to a nominal 1 mm thickness. This resulted in a GRE coupon with a 25 mm wide, 1 mm thick layer of PEEK at one end (FIG. 22). Welds were carried out with varying thickness of PEEK interlayers to assess the impact of the BLT on the joint strength. Both variants described in FIG. 23A and FIG. 23B (i.e., 2-step and 3-step processes) were trialed and tested for comparison. After the final joining process (e.g., third in the three step process—FIG. 23B), the welded coupon as shown in FIG. 24, was trimmed and cut into three single lap shear (SLS) samples for mechanical testing.

nates were first abraded and then adhesively bonded using the commercial Wavistrong® Easy-fit Adhesive (Future Pipe Industries, Inc., Houston, TX).

Mechanical Test Results (Shear Strength)

Figure 25:
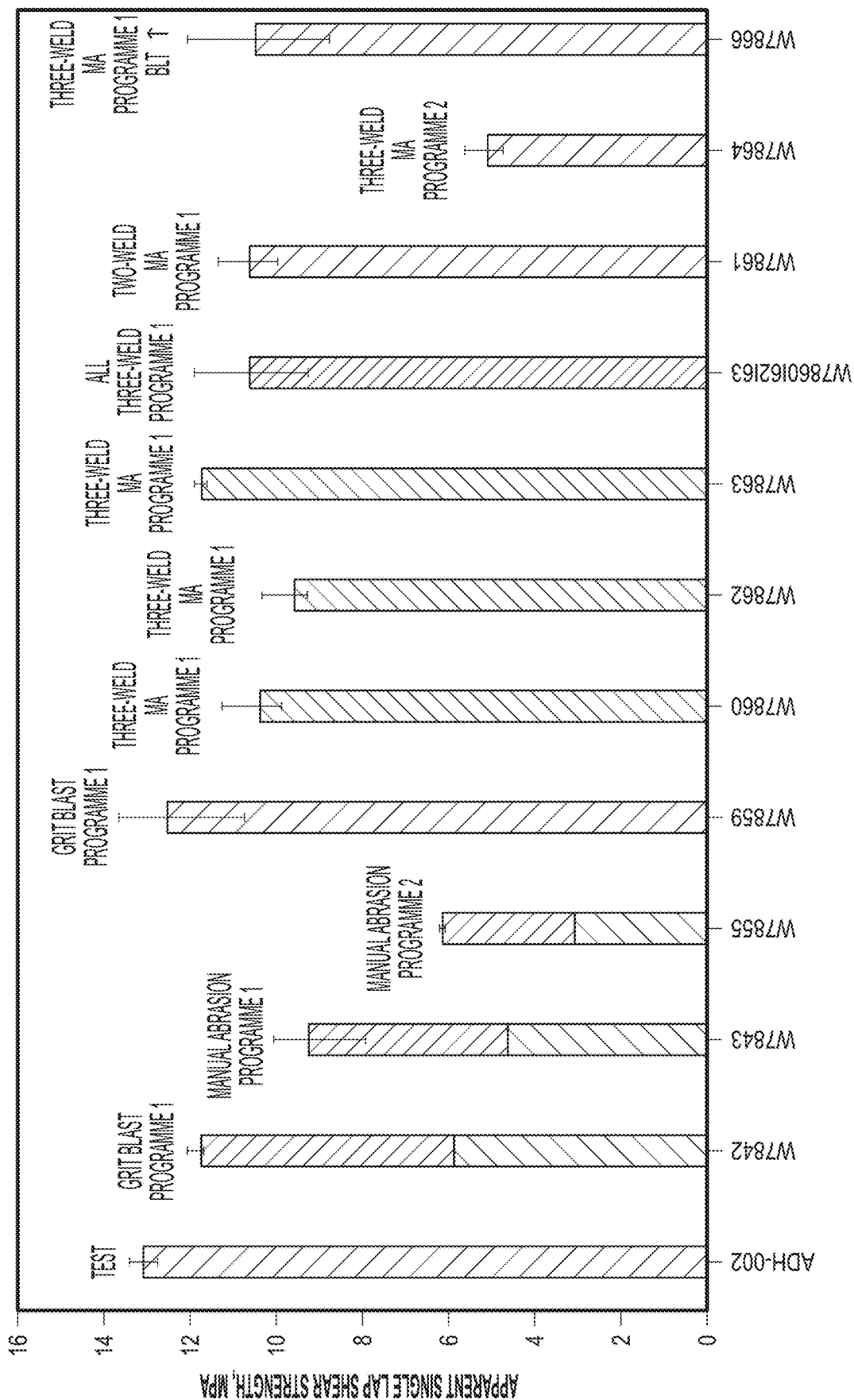
FIG. 25 shows a summary of mechanical properties for the rework linear friction welding specimens in accordance with one or more embodiments of the invention.

A summary of the mechanical test results for the new set of friction welded GRE specimens is shown in Table 5 and FIG. 25. The results are compared against the benchmark values (weld ID ADH-002 in Table 5) measured on adhesive bonded joints of a GRE to GRE laminate denoted "test" in FIG. 25 The benchmark sample W7858 preparation was performed using methods described above (i.e., abrasion then adhesive bonding using Wavistrong® Easy-fit Adhesive). The remaining samples were treated with designated surface abrasion methods and welded according to the designated program as shown in Table 5. Weld types of the samples were designated single (GRE to PEEK), two (GRE-|PEEK to GRE), or three (GRE|PEEK to PEEK|GRE).

All specimens were the single lap shear configuration with a 25 mm overlap length. The highest value of 12.5 MPa was achieved with weld W7859, which was carried out with the correct weld program 'Program 1', and received the previously described grit blast surface preparation.

TABLE 5

Summary of the mechanical test results of friction welded GRE specimens

| Weld ID | Surface Abrasion Method | Welding Program | Weld Type | Measured BLT, mm | Apparent shear strength, MPa | SD, MPa |
|---|---|---|---|---|---|---|
| ADH-002 | | Benchmark | | 1.1 | 13.1 | 0.85 |
| W7842 | Grit Blast | 1 | Single | N/A | 11.81 | 0.18 |
| W7843 | Manual | 1 | Single | N/A | 9.31 | 1.18 |
| W7855 | Manual | 2 | Single | N/A | 6.22 | 0.04 |
| W7859 | Grit | 1 | Three | 0.9 | 12.54 | 1.61 |
| W7860 | Manual | 1 | Three | 0.79 | 10.45 | 0.73 |
| W7862 | Manual | 1 | Three | 1.77 | 9.65 | 0.58 |
| W7863 | Manual | 1 | Three | 1.07 | 11.67 | 0.16 |
| Three weld average (W7860|62|63), (SD) | Manual | 1 | Three | 1.21 (0.50) | 10.59 (1.02) | 1.00 (0.29) |
| W7861 | Manual | 1 | Two | 0.44 | 10.55 | 0.69 |
| W7864 | Manual | 2 | Three | 0.94 | 5.13 | 0.44 |
| W7866 | Manual | 1 | Three | 1.11 | 10.45 | 1.65 |

Mechanical Testing:

An Instron 8800 B530 testing machine was used for all mechanical tests. SLS mechanical testing was carried out according to the guidelines specified in BS ISO 4587 (BSI, 2003) with the following exceptions:

12.5 mm overlap length was increased to 25 mm for some specimens.

Bondline thickness (BLT) deviated from the typical 0.2 mm recommended.

Testing speed was either 1 or 10 mm/minute rather than the standard requirement to operate the machine at a constant test speed so that the average joint will be broken in a period of 65±20 s.

The distance from the grip to the nearest edge of the joint was reduced from the specified 50±1 mm to 37.5 mm due to the increase in overlap length from 12.5 to 25 mm in some specimens.

In addition to the friction welded joints, a set of GRE to GRE joints prepared using adhesive bonding were prepared and tested for benchmarking. For the latter, the GRE lami- Welds W7842, W7843 and W7855 were a single weld between a GRE laminate and a PEEK adherend. In this configuration there is no separate material between the GRE and PEEK adherends, and therefore, no bondline thickness. The specimens from weld W7842 (grit blast) all failed in the PEEK material in a tensile mode rather than in shear at the weld. Therefore, values are shown in FIG. 25 are minimum values. Specimens from weld W7843 (manual abrasion) failed in a mixture of tension in the PEEK and shear at the interface, and again FIG. 25 shows these as minimum values.

The strength of the single weld W7842 specimens (11.8 MPa) is similar to the strength of the three weld W7859 (12.5 MPa).

The lowest strength achieved were from weld W7864, which was carried out with Program 2 and after receiving a manual abrasion surface preparation, which led the worst performance among all.

Figure 26:
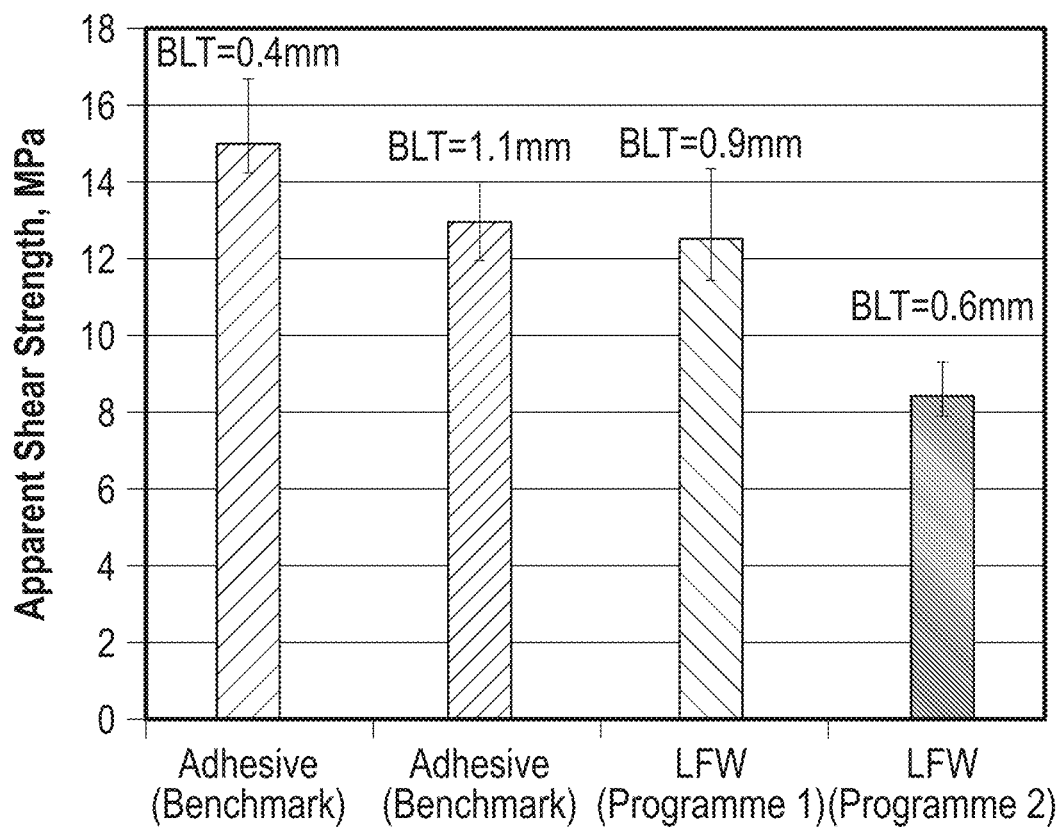
FIG. 26 shows the measured apparent shear strength of GRE laminates jointed using commercial adhesives and a linear friction welding process in accordance with one or more embodiments of the invention.

The measured apparent shear strength values obtained with the new LFW test samples can be compared to that obtained when bonding RTR laminates using commercial adhesives, as shown in FIG. 26.

The set of LFW specimens described previously were manufactured under well controlled conditions, and consequently exhibited significantly higher strengths as compared to the initial LFW trials.

The average strength of the rework LFW joints was 12.5 MPa, which is 86% of the highest equivalent overlap length adhesive joint (15.0 MPa). Comparing the value to the adhesive joint with a similar bond-line thickness (13.1 MPa) shows that the LFW joining process could compete with adhesives under equivalent conditions. The feasibility of using the LFW joining process is even clearer when considering the long-term degradation of the adhesive joint performance, something that the thermoplastic joining approach is less likely to suffer from.

In one or more embodiments, a three-step weld process may be preferred, as both GRE materials can be inspected, abraded and coated with thermoplastic material in the pipe manufacturing process, where the operation can be closely monitored and well controlled. However, both two and three weld operations are provided herein as suitable operations. No significant difference could be seen in the strength results, indicating that the final (GRE|PEEK to PEEK|GRE) weld did not degrade the initial weld that joined the thermoplastic to the thermoset (PEEK to GRE). This observation is critical to the strength of the final joints as the weaker interface is likely to be that between the thermoset GRE and the thermoplastic PEEK. Further evidence is provided by the strengths measured on the single weld GRE-PEEK specimens.

Several of these specimens failed in tension in the PEEK adherend (despite the addition of a composite reinforcing layer bonded to the outside of the PEEK), indicating that the strength of the joint itself was somewhat higher than measured, and that the true strength of the single GRE to PEEK weld has not been determined. However, failure at the joint interface was seen in one of the manual abrasion single weld specimens, suggesting that the true strength is only slightly higher than that measured (11.5 MPa). The highest strength measured for the three-step weld specimens was 12.5 MPa, suggesting that the high temperatures and harsh mechanical oscillations and shear forces experienced in subsequent welds do not degrade the performance of the initial GRE-PEEK joint.

Impact of Surface Preparation

Results of surface free energy and surface profile show that there is some difference in joint apparent shear strength when the GRE is prepared via manual abrasion and grit blasting surface.

To understand the observations of surface preparation, additional surface analysis was carried out on the GRE laminates following surface preparation. Contact angle analysis was used to determine the polar and dispersive surface free energies of the manually abraded and grit blasted GRE laminate and PEEK surfaces.

A Kruss DSA100 was used following the Owens-Wendt-Rabel-Kaelble (OWRK) method specified in BS EN ISO 19403-2 (BSI, 2020), with the following parameters. Contact angle measurements were made on four of the GRE laminates in the areas where surface preparation had been applied. Two were manually abraded and are the two shown on the left of FIG. 27. Two were grit blasted and are shown on the right of FIG. 27.

The surface roughness was analyzed using an Alicona InfiniteFocus SL focus variation microscope. An area approximately 28×18 mm was analyzed on two of each manually abraded and grit blasted GRE laminates.

Figure 27:
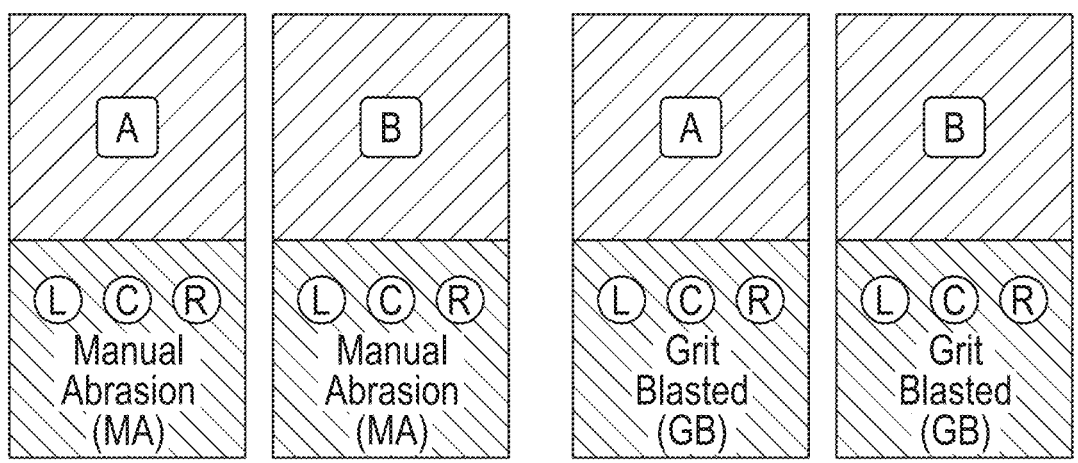
FIG. 27 shows the location of contact angle measurements (L, C, R) on two manually abraded and two grit blasted GRE laminates in accordance with one or more embodiments of the invention.
Figure 28:
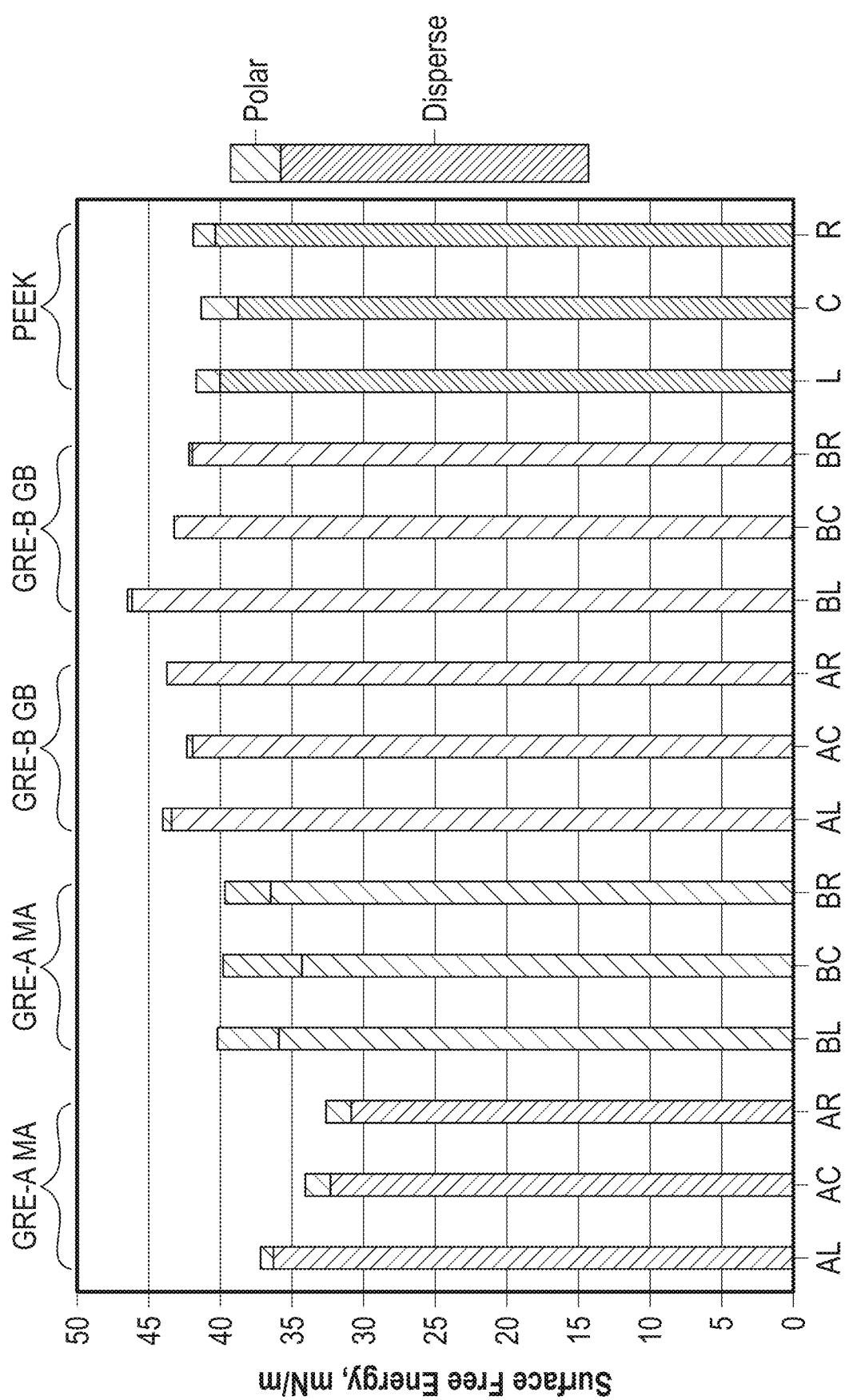
FIG. 28 shows the surface free energy (total, polar and disperse) for the manually abraded (MA) and grit blasted (GB) GRE laminates and PEEK (as machined) surfaces in accordance with one or more embodiments of the invention.

As shown in FIG. 28 and summarized in Table 6, total surface free energy is higher for the grit blasted specimens. The ratio of polar to disperse surface free energy is also slightly lower for the grit blasted surfaces. The three locations (L, C, R) on each specimen refer to the locations shown in FIG. 27.

Surface profile measurements also show a greater roughness, expressed as peak to valley surface height, for the grit blasted specimens. The pseudo-colour images in FIG. 29 also show features that relate to the weave of the GRE laminate were much more prominent on the grit blasted surfaces. The manually abraded surface shows evidence of scratches resulting from the final orbital abrading stage of manual abrasion.

Surface analysis confirmed the importance of surface preparation on the strength of GRE joints. The importance of surface preparation on the performance of adhesively bonded joints is well known. The data provided herein has confirmed the benefit of using grit blasting as a surface preparation technique over manual abrasion. The values shown in Table 6 are averages of the three measured points (left "L", center "C", and right "R") as shown in FIG. 27. A histogram chart of the data values used for these calculations is presented in FIG. 28. There was a 17% increase in total surface free energy from 37.4 mN/m for manually abraded surfaces to 43.8 mN/m for grit blasted surfaces. There was also a corresponding increase (18%) in joint strengths with grit blasted LFW specimens achieving 12.5 MPa compared to 10.6 MPa for the manually abraded specimens. Although both surface preparation approaches offer increased joint strength compared to an unabraded surface, grit blasting offers the potential for a more automated process enabling better quality control and improved reliability of joints.

TABLE 6

Surface analyses of various surface abrasion methods

| Surface | Surface free energy, mN/m | | | Ratio of polar to disperse, % |
|---|---|---|---|---|
| | Disperse | Polar | Total | |
| Manual Abrasion | 34.5 | 2.9 | 37.4 | 8.3 |
| Grit blasting | 43.5 | 0.3 | 43.8 | 0.6 |
| Machined PEEK | 39.7 | 2.0 | 41.7 | 5.1 |

One or more embodiments of the present invention as described above may solve one or more of the following problems or provide one or more of the following advantages.

Systems described herein are advantageous because it is known that the integrity of conventional RTR joints (threaded or adhesive joints) is highly dependent on the skills of the jointer during installation. For example, a joint misalignment, improper application of TEFLON® (registered trademark of the Chemours Company FC, LLC) compound on the threads or excessive torqueing during the joint installation will inevitably impact the interference (contact) pressure between the spigot and socket threads. Further, the degradation of the sealing systems (secondary O-rings) used in some of the joints (e.g., key lock) are known to be the main source of leaks. Further, traditional adhesive bonded joints require careful surface preparation and skilled jointer in the field to make sure that the adhesive is properly and uniformly applied. Thus, an alternative way of joining RTR pipes through a welding process as is described herein simplifies the process and avoids such requirements.

One or more embodiments may provide improved sealing and reliability over prior systems. The sealing may be entirely provided by the thermoplastic tie layers after welding. In conventional joints, the sealing is provided by a contact pressure (O-ring for key lock-joints or TEFLON® (registered trademark of the Chemours Company FC, LLC) wrap in threaded joints). The contact pressure degrades over time and joints end up leaking. In embodiments of the present invention, the sealing is permanent (welded). In addition, bonding strength is improved by the extra welding step as compared to that of conventional thread joints. Also, in one or more embodiments, the sealing function of the welding is valuable because it allows for replacing O-ring sealing systems in key-lock joint or other types of RTR joints entirely.

One or more embodiments may allow for de-skilled installation, as compared to conventional joints, where the quality of the joints often depends on the skills of the jointer (surface treatment, injection of resin, proper application of TEFLON® (registered trademark of the Chemours Company FC, LLC) sealing compound on-site, installation of O-ring, torqueing, etc.). In embodiments of the present invention, the application of the tie layers at the pipe ends can be done at the manufacturing site (controlled production) and the skills required by the jointer at the installation site are reduced. Also, the welding process can be fully automated and is relatively fast.

One or more embodiments may provide better tolerance to installation defects, where small imperfections in the thread making step can potentially be eliminated during the welding of the thermoplastic tie layers (full melting and solidification of the ties layers). In addition, the inherent ductility of thermoplastic materials (compared to thermosets) is likely to provide some additional tolerance to localized deformations/strains at the spigot/socket contact surface and reduce the likelihood of brittle failure of the thermoset resin due to excessive local deformations.

One or more embodiments may provide increased joint strength provided by a larger joining area (i.e., the length of the coupler) and controlled mainly by the strong bonding between the thermoplastic interlayer to thermoset parts when the thermoplastic welding is used both as sealing and jointing system. However, when the thermoplastic welding is combined to another secondary jointing process, the joint strength is mainly controlled by the secondary system (i.e., the threads).

One or more embodiments provide versatility. Embodiments of the present invention can be possibly used as a repair technique on faulty threaded joints in the field. The faulty joints must be modified on site to incorporate the tie layers and enable the welding process post threading.

Embodiments of the present invention provide a smarter joint, where the (electrically) conductive susceptors (used for the induction welding process) can be used subsequently in an integrity monitoring technology (SHM) for crack detection, such as electrical tomography.

From the initial results carried out to demonstrate the technical feasibility, there were two main aspects to highlight: (1) The level of bonding strength achieved using the thermal spraying of PEEK on the GRE laminate using the aluminum interlayer is quite high and found to be unexpectedly advantageous. (2) Being able to bond directly PEEK onto a GRE laminate using friction welding process (which is traditionally used to bond metal to metal pieces) was found to be unexpectedly advantageous.

Improved sealing and reliability: the sealing is entirely provided by the thermoplastic tie layers after welding. In conventional joints, the sealing is provided by a contact pressure (O-ring for key lock-joints or TEFLON® (registered trademark of the Chemours Company FC, LLC) wrap in threaded joints). The contact pressure degrades over time and joints end up leaking. In this innovation, the sealing is permanent (welded). In addition, the effective joining area is larger and thus the permeation path is longer, resulting in a lower long term leak of harmful substances to the environment Increased joint strength: provided by a larger joining area (i.e., the length of the coupler) and controlled mainly by the strong bonding between the thermoplastic interlayer to thermoset parts.

De-skilled installation: as compared to conventional joints, where the quality of the joints often depends on the skills of the jointer (proper application of TEFLON® (registered trademark of the Chemours Company FC, LLC) sealing compound on site, installation of O-ring, torqueing, etc.). In our innovation, the application of the tie layers at the pipe ends can be done at the manufacturing site (controlled production) and the skills required by the jointer at the installation site are reduced. The friction welding process can be automated.

Versatility: with the potential to easily change the joint design and performance, even on-site, through modification of the pipe end taper geometry. The proposed innovation makes the joint easily repairable on site (thermoplastic welding is a reversible process unlike thermoset curing). In addition, the innovation can also be used as a repair technique on straight section of RTR that can be modified on site to incorporate the connecting coupler and the thermoplastic interlayers.

From an operational/economical aspect, our proposed solution can be very competitive compared to the ones described in the prior art. Indeed, our innovation can be retro-fitted on existing pipes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of coupling a first pipe having a tapered, spigot end and a second pipe having a tapered, socket end adapted to internally receive the tapered, spigot end of the first pipe, wherein the first pipe and the second pipe are made from a reinforced thermosetting resin (RTR) material, the method comprising:
   disposing a thermoplastic material onto the RTR material of the first pipe or the second pipe;
   employing a thermal joining process that is a thermal spray deposition, a friction welding process, a resistive implant heating process, or any combination thereof to bond the thermoplastic material on the RTR material,
   inserting the first pipe into the second pipe; and
   heating the thermoplastic material sufficiently to melt the thermoplastic material such that, when the heat is removed, the thermoplastic material hardens such that the thermoplastic material seals the first pipe to the second pipe.

2. The method of claim 1, wherein disposing the thermoplastic material onto the RTR material of the first pipe or the second pipe comprises:

coating at least one of the first pipe or the second pipe with a the thermoplastic material, and employing the thermal joining process to bond the thermoplastic material on the RTR material.

3. The method of claim 1, wherein an electrically conductive susceptor is disposed on at least one of the first pipe or the second pipe, the method further comprising using the electrically conductive susceptor for crack detection for integrity monitoring technology of a pipeline.

4. The method of claim 1, wherein the second pipe is a coupler comprising two tapered socket ends, a system further comprising a third pipe having a tapered, spigot end, wherein the sockets ends of the coupler are adapted to internally receive the tapered, spigot end of the first pipe and the third pipe, and wherein the coupler and the third pipe are made from RTR material, the method comprising:

disposing a thermoplastic material between an exterior of the first pipe and an interior of the coupler;

disposing a thermoplastic material between an exterior of the third pipe and an interior of the coupler;

employing a thermal joining process to bond the thermoplastic material on the RTR material of the first pipe, the coupler, or the third pipe, inserting the first pipe and the third pipe into the coupler; and heating the thermoplastic material between at least one of the exterior of the first pipe and an interior of the coupler and the exterior of the third pipe and the interior of the coupler, sufficiently to melt the thermoplastic material such that, when the heat is removed, the hardened thermoplastic material seals the first pipe and the third pipe to the coupler.

5. The method of claim 4, wherein disposing the thermoplastic material between an exterior of the first pipe and an interior of the coupler and disposing a thermoplastic material between an exterior of the third pipe and an interior of the coupler comprises:

coating at least one of the first pipe, the second pipe, and the coupler with the thermoplastic material, and employing the thermal joining process to bond the thermoplastic material on the RTR material.

6. The method of claim 1, wherein the thermoplastic material comprises a thermoplastic coating and a susceptor, the method further comprises:

depositing the susceptor on a to-be-jointed RTR surface.

7. The method of claim 6, wherein the thermoplastic coating is on top of the susceptor.

8. The method of claim 6, further comprising:

depositing the thermoplastic coating by thermal spraying or friction welding.

9. The method of claim 6, wherein the susceptor is electronically conductive, a smart joint, or combinations thereof, the method further comprises:

detecting cracks of a pipeline with integrity monitoring technology.

10. The method of claim 1, wherein the thermoplastic material comprises a thermoplastic coating and a susceptor, the method further comprises:

depositing the susceptor on top of the thermoplastic coating.

11. The method of claim 1, further comprising:

embedding a susceptor filler in a thermoplastic matrix of the thermoplastic material.

12. The method of claim 11, wherein embedding the susceptor filler in the thermoplastic matrix comprises:

depositing the thermoplastic material onto the RTR material by applying a thermoplastic implant while the thermoset is in a partially cured state, followed by co-curing at a required temperature, wherein the required temperature is below a melting temperature of the thermoplastic material.

13. The method of claim 1, further comprising:

bonding thermoplastic material directly onto the RTR material of the first pipe, the second pipe, or both the first pipe and the second pipe.

* * * * *